(12) United States Patent
Suto

(10) Patent No.: US 11,410,321 B2
(45) Date of Patent: Aug. 9, 2022

(54) DISTANCE MEASURING CAMERA

(71) Applicant: MITSUMI ELECTRIC CO., LTD., Tokyo (JP)

(72) Inventor: Satoru Suto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 53 days.

(21) Appl. No.: 17/258,131

(22) PCT Filed: Jun. 13, 2019

(86) PCT No.: PCT/JP2019/023487
§ 371 (c)(1),
(2) Date: Jan. 5, 2021

(87) PCT Pub. No.: WO2020/008832
PCT Pub. Date: Jan. 9, 2020

(65) Prior Publication Data
US 2021/0279901 A1      Sep. 9, 2021

(30) Foreign Application Priority Data

Jul. 6, 2018  (JP) .............................. JP2018-129387

(51) Int. Cl.
*G06T 7/55*      (2017.01)
*G01C 3/02*      (2006.01)

(52) U.S. Cl.
CPC .................. *G06T 7/55* (2017.01); *G01C 3/02* (2013.01); *G06T 2207/10028* (2013.01)

(58) Field of Classification Search
CPC .... G01C 3/02; G01C 3/08; G01C 3/14; G06T 2207/10028; G06T 2207/10148; G06T 7/55; G06T 7/593
See application file for complete search history.

(56) References Cited

U.S. PATENT DOCUMENTS

| | | | |
|---|---|---|---|
| 2021/0042401 A1* | 2/2021 | Nagai | G06V 40/166 |
| 2021/0262793 A1* | 8/2021 | Suto | H04N 5/247 |
| 2021/0279903 A1* | 9/2021 | Suto | G01C 3/08 |

FOREIGN PATENT DOCUMENTS

| | | | |
|---|---|---|---|
| EP | 2597421 A1 | 5/2013 | |
| EP | 3730898 A1 | 10/2020 | |

(Continued)

OTHER PUBLICATIONS

European Patent Office, Extended European Search Report Issued in Application No. 19831107.8, dated Oct. 25, 2021, Germany, 7 pages.

(Continued)

*Primary Examiner* — Farzana Hossain
(74) *Attorney, Agent, or Firm* — McCoy Russell LLP

(57) ABSTRACT

The distance-measuring camera contains a first optical system for forming a first subject image, a second optical system for forming a second subject image, an imaging part for imaging the first subject image and the second subject image and a distance calculating part for calculating a first candidate for a distance to the subject based on an image magnification ratio between a magnification of the first subject image imaged by the imaging part and a magnification of the second subject image imaged by the imaging part and a second candidate for the distance to the subject based on a parallel disparity between the first subject image and the second subject image. The distance calculating part selects either one of the first candidate and the second candidate as the distance to the subject according to a predetermined condition.

8 Claims, 6 Drawing Sheets

(56) References Cited

FOREIGN PATENT DOCUMENTS

| | | |
|---|---|---|
| JP | H03200007 A | 9/1991 |
| JP | 2001141422 A | 5/2001 |
| JP | 2012026841 A | 2/2012 |
| JP | 2019109124 A | 7/2019 |
| RU | 2095756 C1 | 11/1997 |
| RU | 2340872 C1 | 12/2008 |
| WO | 2016063545 A1 | 4/2016 |
| WO | 2018042801 A1 | 3/2018 |

OTHER PUBLICATIONS

ISA Japan Patent Office, International Search Report Issued in Application No. PCT/JP2019/023487, dated Jul. 16, 2019, WIPO, 6 pages.

\* cited by examiner $f_1=f_2=f$
$EP_1 \neq EP_2$
$D=0$ $f_1=f_2=f$
$EP_1=EP_2=EP$
$D \neq 0$

DISTANCE MEASURING CAMERA

CROSS REFERENCE TO RELATED APPLICATIONS

The present application is a U.S. National Phase of International Application No. PCT/JP2019/023487 entitled "DISTANCE MEASUREMENT CAMERA," and filed on Jun. 13, 2019. International Application No. PCT/JP2019/023487 claims priority to Japanese Patent Application No. 2018-129387 filed on Jul. 6, 2018. The entire contents of each of the above-listed applications are hereby incorporated by reference for all purposes.

TECHNICAL FIELD

The present invention generally relates to distance measuring cameras for measuring a distance to a subject, in particular to a distance measuring camera for measuring a distance to a subject based on an image magnification ratio between at least two subject images formed by at least two optical systems or a parallel disparity between the at least two subject images formed by the at least two optical systems.

BACKGROUND AND SUMMARY

Conventionally, there has been proposed a distance measuring camera for measuring a distance to a subject by imaging the subject. As such a distance measuring camera, a stereo camera type distance measuring camera including two or more pairs of an optical system for collecting light from the subject to form a subject image and an image sensor for converting the subject image formed by the optical system to an image signal (for example, see patent document 1).

The stereo camera type distance measuring camera disclosed in the patent document 1 can calculate a parallel disparity (disparity in a direction perpendicular to an optical axis direction) between the two subject images respectively formed by the two optical systems arranged so as to be shifted from each other in the direction perpendicular to the optical axis direction and calculate the distance to the subject based on a value of the parallel disparity.

In a case of utilizing this distance measurement based on the parallel disparity between the subject images as described above, the distance to the subject cannot be accurately calculated when the parallel disparity between the subject images is small. Thus, it is necessary to arrange the two optical systems so as to be largely spaced apart from each other in the direction perpendicular to the optical axis in order to sufficiently increase the parallel disparity between the subject images. This makes it difficult to reduce the size of the distance measuring camera.

Further, when the subject is located at a near distance from the distance measuring camera, there may be a situation that a feature point of the subject image for calculating the parallel disparity exists in one of two image data and does not exist in the other one of the two image data due to a relationship of visual fields of the two obtained image data. In order to avoid this situation, it is necessary to arrange the two optical systems so as to be close to each other. However, if the two optical systems are arranged so as to be close to each other, the parallel disparity between the subject images becomes small and thus the accuracy of the distance measurement reduces. Therefore, it is difficult to accurately calculate the distance to the subject located at the near distance from the distance measuring camera with the distance measurement based on the parallel disparity between the subject images.

On the other hand, the parallel disparity between the subject images does not depend on a size of the subject image in each obtained image data (an occupancy ratio of the subject image in each image data). Thus, the distance measurement based on the parallel disparity between the subject images can accurately calculate the distance to the subject even if the size of the subject image in each image data is small. Examples of a situation in which the size of the subject image in each image data is small contain a situation in which a size of the subject is originally small and a situation in which the subject is located at a far distance from the distance measuring camera. Therefore, the distance measurement based on the parallel disparity between the subject images is suitable for measuring the distance to the subject having a small size and the distance to the subject located at the far distance from the distance measuring camera.

Therefore, whereas the distance measurement based on the parallel disparity between subject images is unsuitable for measuring the distance to the subject located at the near distance from the distance measuring camera, the distance measurement based on the parallel disparity between subject images is suitable for measuring the distance to the subject having the small size and the distance to the subject located at the far distance from the distance measuring camera.

On the other hand, an image magnification ratio type distance measuring camera for calculating a distance to a subject based on an image magnification ratio between two subject images (ratio between magnifications of the two subject images) has been proposed by the inventor of the present invention and others. The image magnification ratio type distance measuring camera uses two optical systems configured so that changes of magnifications of subject images respectively formed by the two optical systems according to the distance to the subject are different from each other and calculates the distance to the subject based on the image magnification ratio between the two subject images (the ratio between the magnifications of the two subject images) respectively formed by the two optical systems (see patent document 2).

In this distance measurement based on the image magnification ratio between the subject images, the parallel disparity between the subject images is not utilized for calculating the distance to the subject. Thus, even if the two optical systems are arranged so as to be close to each other, it is possible to accurately calculate the distance to the subject. Therefore, it is possible to reduce the size of the distance measuring camera.

In order to calculate the image magnification ratio between the subject images, two image data is first obtained by imaging the two subject images respectively formed by the two optical systems and then a ratio between sizes of the two subject images actually measured from the two image data (a size of a first subject image and a size of a second subject image) is taken as the image magnification ratio between the subject images. If the size of the subject image in each image data (an occupancy ratio of the subject image in each image data) is large, it is possible to actually measure the size of the subject image in each image data with high accuracy. Thus, when the size of the subject image in each image data is large, it is possible to accurately obtain the image magnification ratio between the subject images and accurately calculate the distance to the subject. Examples of a situation in which the size of the subject image in each image data is large contain a situation in which the size of the subject is originally large and a situation in which the subject is located at a near distance from the distance measuring camera. For the reasons stated above, the distance measurement based on the image magnification ratio between the subject images is suitable for calculating the distance to the subject having the large size and the distance to the subject located at the near distance from the distance measuring camera.

On the other hand, if the size of the subject image in each image data (the occupancy ratio of the subject image in each image data) is small, it is difficult to actually measure the size of the subject image from each image data with high accuracy. Thus, when the size of the subject image in each image data is small, it becomes difficult to accurately obtain the image magnification ratio between the subject images and accurately calculate the distance to the subject. As described above, the examples of the situation in which the size of the subject image in each image data is small contain the situation in which the size of the subject is originally small and the situation in which the subject is located at the far distance from the distance measuring camera. For the reasons stated above, the distance measurement based on the image magnification ratio between the subject images is unsuitable for calculating the distance to the subject having the small size and the distance to the subject located at the far distance from the distance measuring camera.

Therefore, whereas the distance measurement based on the image magnification ratio between the subject images is suitable for measuring the distance to the subject having the large size and the distance to the subject located at the near distance from the distance measuring camera, the distance measurement based on the image magnification ratio between the subject images is unsuitable for calculating the distance to the subject having the small size and the distance to the subject located at the far distance from the distance measuring camera.

As described above, the distance measurement based on the parallel disparity between the subject images and the distance measurement based on the image magnification ratio between the subject images have different strong ranges and different weak ranges. Thus, it is very difficult to accurately calculate the distance to the subject regardless of the distance to the subject and the size of the subject.

RELATED ART DOCUMENT

Patent Documents

JP 2012-26841A
JP 2017-241896

Problem to be Solved by the Invention

The present invention has been made in view of the above-mentioned problem of the conventional art. Accordingly, it is an object of the present invention to provide a distance measuring camera which can accurately calculate a distance to a subject regardless of the distance to the subject and a size of the subject.

Means for Solving the Problems

The above object is achieved by the present inventions defined in the following (1) to (8).
(1) A distance measuring camera, comprising:
a first optical system for collecting light from a subject to form a first subject image;
a second optical system for collecting the light from the subject to form a second subject image, the second optical system arranged so as to be shifted from the first optical system in a direction perpendicular to an optical axis direction of the first optical system;
an imaging part for imaging the first subject image formed by the first optical system and the second subject image formed by the second optical system; and
a distance calculating part for calculating a first candidate for the distance to the subject based on an image magnification ratio between a magnification of the first subject image imaged by the imaging part and a magnification of the second subject image imaged by the imaging part and a second candidate for the distance to the subject based on a parallel disparity between the first subject image and the second subject image,
wherein the distance calculating part selects either one of the first candidate and the second candidate as the distance to the subject according to a predetermined condition.
(2) The distance measuring camera according to the above (1), wherein the distance calculating part selects the second candidate calculated based on the parallel disparity as the distance to the subject when a size of the subject is less than a predetermined threshold and selects the first candidate calculated based on the image magnification ratio as the distance to the subject when the size of the subject is equal to or larger than the predetermined threshold.
(3) The distance measuring camera according to the above (1), wherein the distance calculating part selects the first candidate calculated based on the image magnification ratio as the distance to the subject when both of the first candidate and the second candidate are less than a predetermined threshold and selects the second candidate calculated based on the parallel disparity as the distance to the subject when both of the first candidate and the second candidate are equal to or larger than the predetermined threshold.
(4) The distance measuring camera according to any one of the above (1) to (3), wherein the first optical system and the second optical system are configured so that a change of the magnification of the first subject image according to the distance to the subject is different from a change of the magnification of the second subject image according to the distance from the subject.
(5) The distance measuring camera according to the above (4), wherein the first optical system and the second optical system are configured so that a focal length of the first optical system and a focal length of the second optical system are different from each other, and thereby the change of the magnification of the first subject image according to the distance to the subject is different from the change of the magnification of the second subject image according to the distance to the subject.
(6) The distance measuring camera according to the above (4) or (5), wherein the first optical system and the second optical system are configured so that a distance from an exit pupil of the first optical system to an image formation position of the first subject image formed by the first optical system when the subject is located at an infinite distance point is different from a distance from an exit pupil of the second optical system to an image formation position of the second subject image formed by the second optical system when the subject is located at the infinite distance point, and thereby the change of the magnification of the first subject image according to the distance to the subject is different from the change of the magnification of the second subject image according to the distance to the subject.

(7) The distance measuring camera according to any one of the above (4) to (6), wherein a depth disparity in the optical direction of the first optical system exists between a front principal point of the first optical system and a front principal point of the second optical system, and thereby the change of the magnification of the first subject image according to the distance to the subject is different from the change of the magnification of the second subject image according to the distance to the subject.

(8) The distance measuring camera according to any one of (1) to (7), wherein the imaging part contains a first image sensor for imaging the first subject image and a second image sensor for imaging the second subject image.

Effects of the Invention

The distance measuring camera of the present invention selects either one of the first candidate calculated based on the image magnification ratio between the subject images and the second candidate calculated based on the parallel disparity between the subject images as the distance to the subject according to the predetermined condition. Therefore, according to the distance measuring camera of the present invention, it is possible to accurately calculate the distance to the subject regardless of the distance to the subject and the size of the subject.

Further, since the distance measuring camera of the present invention selects the first candidate calculated based on the image magnification ratio between the subject images as the distance to the subject when the subject is located at a near distance from the distance measuring camera, the parallel disparity between the subject images is not used for calculating the distance to the subject located at the near distance from the distance measuring camera. Therefore, since it is not necessary to consider the parallel disparity between the subject images when the subject is located at the near distance from the distance measuring camera, it is possible to arrange the first optical system and the second optical system so as to be close to each other in the distance measuring camera of the present invention. Therefore, it is possible to reduce the size of the distance measuring camera of the present invention as compared with the conventional stereo camera type distance measuring camera.

DETAILED DESCRIPTION

Figure 1:
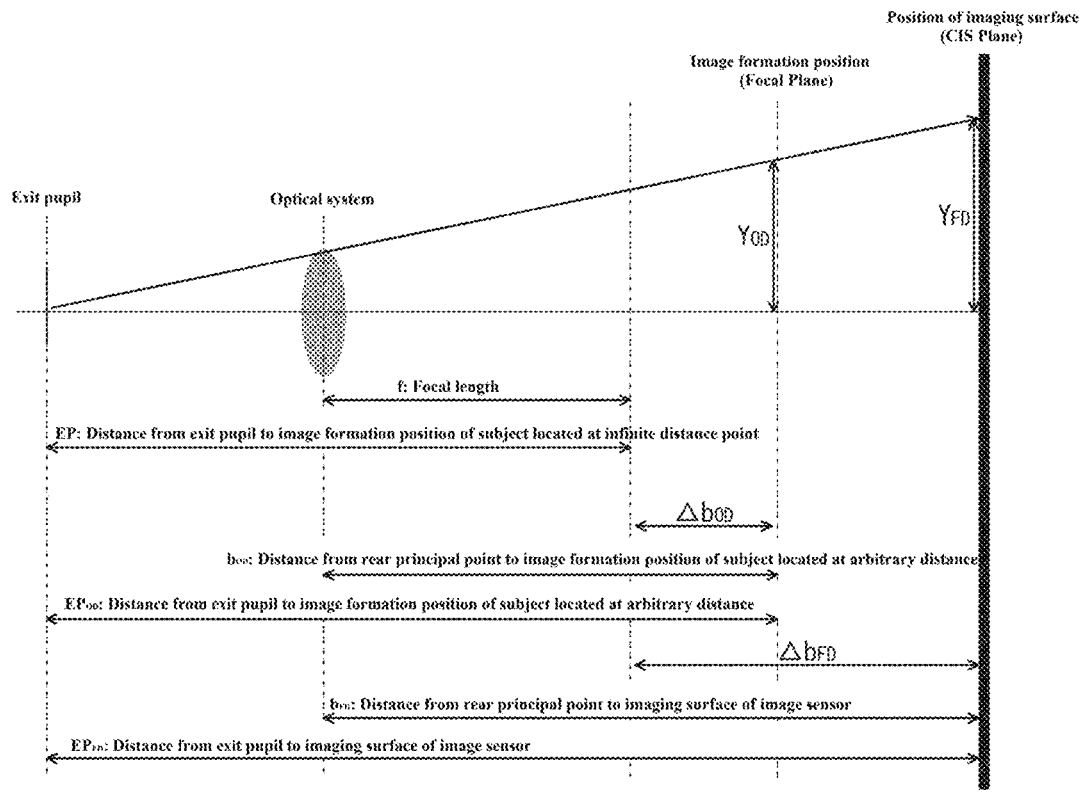
FIG. 1 is a view for explaining a distance measurement principle based on an image magnification ratio between subject images used in a distance measuring camera of the present invention.

First, description will be given to a distance measurement principle for calculating a distance to a subject based on an image magnification ratio between subject images used in a distance measuring camera of the present invention. In the drawings, components providing same or similar functions are denoted by the same reference numerals.

A magnification "$m_{OD}$" of a subject image formed by an optical system can be calculated from a distance (subject distance) "a" from a front principal point (front principal plane) of the optical system to a subject, a distance "$b_{OD}$" from a rear principal point (rear principal plane) of the optical system to an image formation position of the subject image and a focal length "f" of the optical system according to the following equation (1) derived from the lens equation.

[Equation 1]

$$m_{OD} = \frac{b_{OD}}{a} = \frac{f}{a-f} \qquad (1)$$

Further, a size "$Y_{OD}$" of the subject image can be calculated from the magnification "$m_{OD}$" of the subject image and an actual size "sz" of the subject according to the following equation (2).

[Equation 2]

$$Y_{OD} = sz \cdot m_{OD} = \frac{sz \cdot f}{a-f} \qquad (2)$$

When an imaging surface of an image sensor (imaging element) is located at the image formation position of the subject image, that is, when the subject image is in the best focus, the size "$Y_{OD}$" of the subject image can be calculated by the above equation (2). When the optical system has an autofocus function and always images the subject with the best focus, the size "$Y_{OD}$" of the subject image can be calculated by the above equation (2).

However, when the optical system is a fixed focus system having no autofocus function and the imaging surface of the image sensor (imaging element) is not located at the image formation position of the subject image, that is, when defocus is present, it is required to consider a defocus amount, that is, a difference (shift amount) between the image formation position of the subject image and a position of the imaging surface of the image sensor in a depth direction (optical axis direction) in order to obtain a size "$Y_{FD}$" of the subject image formed on the imaging surface of the image sensor.

As shown in FIG. 1, a distance from an exit pupil of the optical system to an image formation position of the subject image when the subject is located at an infinite distance point is defined as "EP", a distance from the exit pupil of the optical system to an image formation position of the subject image when the subject is located at an arbitrary distance "a" is defined as "$EP_{OD}$" and a distance (Focus Distance) from the exit pupil of the optical system to the imaging surface of the image sensor is defined as "$EP_{FD}$". Further, a distance from the rear principal point of the optical system to the image formation position of the subject image when the subject is located at the arbitrary distance "a" is defined as "$b_{OD}$" and a distance from the rear principal point of the optical system to the imaging surface of the image sensor is defined as "$b_{FD}$". In the illustrated aspect, for the sake of simplicity of description, the optical system is schematically illustrated so that the rear principal point of the optical system is located at a center position of the optical system.

The distance "$b_{OD}$" from the rear principal point of the optical system to the image formation position of the subject image when the subject is located at the arbitrary distance "a" can be calculated according to the following equation (3) derived from the lens equation.

[Equation 3]

$$b_{OD} = \frac{1}{1/f - 1/a} = \frac{a \cdot f}{a - f} \quad (3)$$

Therefore, a difference "$\Delta b_{OD}$" between the focal length "f" and the distance "$b_{OD}$" can be calculated according to the following equation (4).

[Equation 4]

$$\Delta b_{OD} = b_{OD} - f = \frac{a \cdot f}{a - f} - f = \frac{f^2}{a - f} \quad (4)$$

Further, the distance "$b_{FD}$" from the rear principal point of the optical system to the imaging surface of the image sensor can be calculated from a distance "$a_{FD}$" from the front principal point of the optical system to the subject when the subject image is in the best focus on the imaging surface of the image sensor according to the following equation (5) derived from the lens equation.

[Equation 5]

$$b_{FD} = \frac{1}{1/f - 1/a_{FD}} = \frac{a_{FD} \cdot f}{a_{FD} - f} \quad (5)$$

Therefore, a difference "$\Delta b_{FD}$" between the focal length "f" and the distance "$b_{FD}$" can be calculated according to the following equation (6).

[Equation 6]

$$\Delta b_{FD} = b_{FD} - f = \frac{a_{FD} \cdot f}{a_{FD} - f} - f = \frac{f^2}{a_{FD} - f} \quad (6)$$

Further, as is clear from FIG. 1, a right-angled triangle having one vertex at the intersection of the optical axis and the exit pupil of the optical system and one side which is the size "$Y_{OD}$" of the subject image at the image formation position of the subject image when the subject is located at the arbitrary distance "a" is similar to a right-angled triangle having one vertex at the intersection of the optical axis and the exit pupil of the optical system and one side which is the size "$Y_{FD}$" of the subject image on the imaging surface of the image sensor. Therefore, "$EP_{OD}:EP_{FD}$"="$Y_{OD}:Y_{FD}$" is satisfied from the similarity relationship and the size "$Y_{FD}$" of the subject image on the imaging surface of the image sensor can be calculated according to the following equation (7).

[Equation 7]

$$EP_{OD}:EP_{FD} = Y_{OD}:Y_{FD} \quad (7)$$
$$EP + \Delta b_{OD} : EP + \Delta b_{FD} = Y_{OD}:Y_{FD}$$
$$Y_{FD} = \frac{EP + \Delta b_{FD}}{EP + \Delta b_{OD}} \cdot Y_{OD} = \left( \frac{f^2 - EP \cdot f +}{EP \cdot a_{FD}} \middle/ \frac{f^2 - EP \cdot f +}{a_{FD} - f} \cdot \frac{EP \cdot a}{a - f} \right) \cdot \frac{sz \cdot f}{a - f} =$$
$$\frac{sz \cdot f \cdot \left( \frac{f^2 - EP \cdot f +}{EP \cdot a_{FD}} \right)}{(a_{FD} - f) \cdot \left( \frac{f^2 - EP \cdot f +}{EP \cdot a} \right)}$$

As is clear from the above equation (7), the size "$Y_{FD}$" of the subject image on the imaging surface of the image sensor can be expressed as a function of the actual size "sz" of the subject, the focal length "f" of the optical system, the distance "EP" from the exit pupil of the optical system to the image formation position of the subject image when the subject is located at the infinite distance point, the distance (subject distance) "a" from the exit pupil of the optical system to the subject and the distance (Focus Distance) "$a_{FD}$" from the exit pupil of the optical system to the subject when the subject image is in the best focus on the imaging surface of the image sensor.

Figure 2:
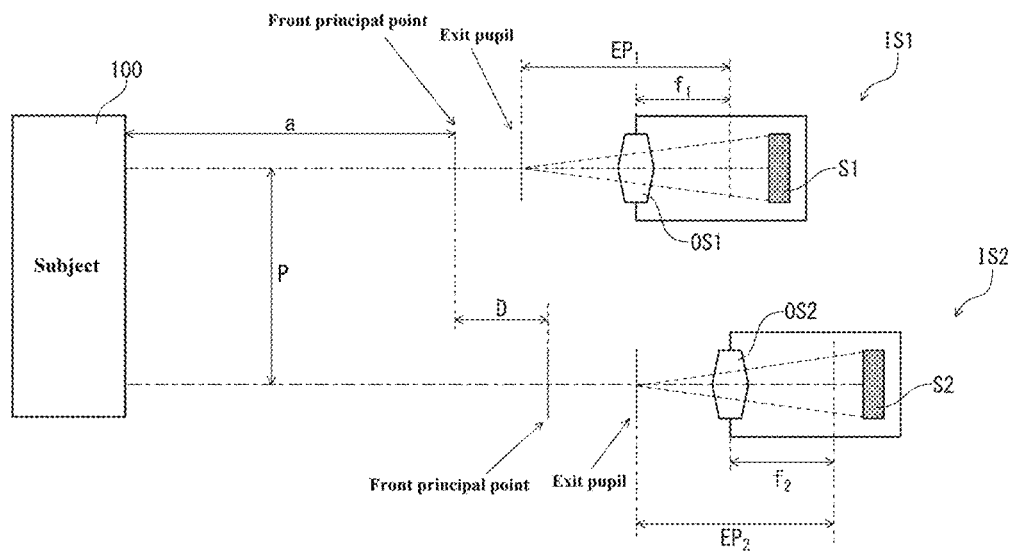
FIG. 2 is another view for explaining the distance measurement principle based on the image magnification ratio between the subject images used in the distance measuring camera of the present invention.

Next, it is assumed that one subject 100 is imaged by using two imaging systems IS1, IS2 as shown in FIG. 2. The first imaging system IS1 includes a first optical system OS1 for collecting light from the subject 100 to form a first subject image and a first image sensor S1 for imaging the first subject image formed by the first optical system OS1. The second imaging system IS2 includes a second optical system OS2 for collecting the light from the subject 100 to form a second subject image and a second image sensor S2 for imaging the second subject image formed by the second optical system OS2. Further, as is clear from FIG. 2, although an optical axis of the first optical system OS1 of the first imaging system IS1 and an optical axis of the second optical system OS2 of the second imaging system IS2 are parallel to each other, the optical axis of the first optical system OS1 and the optical axis of the second optical system OS2 do not coincide with each other. Further, the second optical system OS2 is arranged so as to be shifted from the first optical system OS1 by a distance "P" in a direction perpendicular to an optical axis direction of the first optical system OS1. Thus, a parallel disparity (disparity in the direction perpendicular to the optical axis direction of the first optical system OS1 or the second optical system OS2) exists between the first subject image formed by the first optical system OS1 and the second subject image formed by the second optical system OS2.

Although the optical axis of the first optical system OS1 and the optical axis of the second optical system OS2 are parallel to each other in the illustrated aspect, the present invention is not limited thereto. For example, the first optical system OS1 and the second optical system OS2 may be arranged so that an angle of the optical axis of the first optical system OS1 (angular parameters θ and φ of the three-dimensional polar coordinate) and an angle of the optical axis of the second optical system OS2 are different from each other. However, for the sake of simplicity of description, it is assumed that the first optical system OS1 and the second optical system OS2 are arranged so that the optical axis of the first optical system OS1 and the optical axis of the second optical system OS2 are parallel to each other but do not coincide with each other with being spaced apart from each other by the distance "P" as shown in FIG. 2.

The first optical system OS1 and the second optical system OS2 are fixed-focus optical systems each having different focal lengths "$f_1$" and "$f_2$". When the first imaging system IS1 is configured, a position (lens position) of the first optical system OS1, that is, a separation distance between the first optical system OS1 and the first image sensor S1 is adjusted so that the first subject image of the subject 100 which is located at an arbitrary distance "$a_{FD1}$" is formed on an imaging surface of the first image sensor S1, that is, the subject 100 which is located at the arbitrary distance "$a_{FD1}$" is in the best focus. Similarly, when the second imaging system IS2 is configured, a position (lens position) of the second optical system OS2, that is, a separation distance between the second optical system OS2 and the second image sensor S2 is adjusted so that the second subject image of the subject 100 which is located at an arbitrary distance "$a_{FD2}$" is formed on an imaging surface of the second image sensor S2, that is, the subject 100 which is located at the arbitrary distance "$a_{FD2}$" is in the best focus.

Further, a distance from an exit pupil of the first optical system OS1 to an image formation position of the first subject image when the subject 100 is located at the infinite distance point is "$EP_1$" and a distance from an exit pupil of the second optical system OS2 to an image formation position of the second subject image when the subject 100 is located at the infinite distance point is "$EP_2$".

The first optical system OS1 and the second optical system OS2 are configured and arranged so that a distance (depth disparity) "D" in the depth direction (optical axis direction) exists between a front principal point (front principal plane) of the first optical system OS1 and a front principal point (front principal plane) of the second optical system OS2. Namely, when a distance (subject distance) from the front principal point of the first optical system OS1 to the subject 100 is defined as "a", a distance from the front principal point of the second optical system OS2 to the subject 100 is "a+D".

By using the similarity relationship described with reference to FIG. 1, a magnification "$m_1$" of the first subject image formed on the imaging surface of the first image sensor S1 by the first optical system OS1 can be calculated according to the following equation (8).

[Equation 8]

$$m_1 = \frac{EP_{FD1}}{EP_{OD1}} \cdot m_{OD1} = \frac{EP_1 + \Delta b_{FD1}}{EP_1 + \Delta b_{OD1}} \cdot m_{OD1} \quad (8)$$

Here, "$EP_{OD1}$" is a distance from the exit pupil of the first optical system OS1 to an image formation position of the first subject image when the subject 100 is located at the distance "a". "$EP_{FD1}$" is a distance from the exit pupil of the first optical system OS1 to the imaging surface of the first image sensor S1. A positional relationship between the distance "$EP_{OD1}$" and the distance "$EP_{FD1}$" is determined at the time of configuring the first imaging system IS1 by adjusting the position (lens position) of the first optical system OS1 so that the subject 100 located at the distance "$a_{FD1}$" is in the best focus. Further, "$\Delta b_{OD1}$" is a difference between the focal length "$f_1$" and a distance "$b_{OD1}$" from a rear principal point of the first optical system OS1 to the image formation position of the first subject image when the subject 100 is located at the distance "a". "$\Delta b_{FD1}$" is a difference between the focal length "$f_1$" and a distance "$b_{FD1}$" from the rear principal point of the first optical system OS1 to the imaging surface of the first image sensor S1. "$m_{OD1}$" is a magnification of the first subject image at the image formation position of the first subject image when the subject 100 is located at the distance "a".

Since the above equations (1), (4) and (6) can be applied to the image formation by the first optical system OS1, the above equation (8) can be expressed by the following equation (9).

[Equation 9]

$$m_1 = \left( \frac{f_1^2 - EP_1 \cdot f_1 +}{EP_1 \cdot a_{FD1}} \middle/ \frac{f_1^2 - EP_1 \cdot f_1 +}{EP_1 \cdot a} \right) \cdot \frac{f_1}{a - f_1} = \quad (9)$$

$$\frac{f_1 \cdot \left( \frac{f_1^2 - EP_1 \cdot f_1 +}{EP_1 \cdot a_{FD1}} \right)}{(a_{FD1} - f_1) \cdot \left( \frac{f_1^2 - EP_1 \cdot f_1 +}{EP_1 \cdot a} \right)}$$

Here, "$a_{FD1}$" is the distance from the front principal point of the first optical system OS1 to the subject 100 when the first subject image is in the best focus on the imaging surface of the first image sensor S1.

Similarly, a magnification "$m_2$" of the second subject image formed on the imaging surface of the second image sensor S2 by the second optical system OS2 can be calculated according to the following equation (10).

[Equation 10]

$$m_2 = \frac{EP_{FD2}}{EP_{OD2}} \cdot m_{OD2} = \frac{EP_2 + \Delta b_{FD2}}{EP_2 + \Delta b_{OD2}} \cdot m_{OD2} = \qquad (10)$$

$$\left( \frac{f_2^2 - EP_2 \cdot f_2 +}{\frac{EP_2 \cdot a_{FD2}}{a_{FD2} - f_2}} \Big/ \frac{f_2^2 - EP_2 \cdot f_2 +}{\frac{EP_2 \cdot (a+D)}{(a+D) - f_2}} \right) \cdot \frac{f_2}{(a+D) - f_2} =$$

$$\frac{f_2 \cdot \left( \frac{f_2^2 - EP_2 \cdot f_2 +}{EP_2 \cdot a_{FD2}} \right)}{(a_{FD2} - f_2) \cdot \left( \frac{f_2^2 - EP_2 \cdot f_2 +}{EP_2 \cdot (a+D)} \right)}$$

Here, "$EP_{OD2}$" is a distance from the exit pupil of the second optical system OS2 to an image formation position of the second subject image when the subject 100 is located at the distance "a+D". "$EP_{FD2}$" is a distance from the exit pupil of the second optical system OS2 to the imaging surface of the second image sensor S2. A positional relationship between the distance "$EP_{OD2}$" and the distance "$EP_{FD2}$" is determined at the time of configuring the second imaging system IS2 by adjusting the position (lens position) of the second optical system OS2 so that the subject 100 located at the arbitrary distance "$a_{FD2}$" is in the best focus. In addition, "$\Delta b_{OD2}$" is a difference between the focal length "$f_2$" and a distance "$b_{OD2}$" from the rear principal point of the second optical system OS2 to the image formation position of the second subject image when the subject 100 is located at the distance "a+D". "$\Delta b_{FD2}$" is a difference between the focal length "$f_2$" and a distance "$b_{FD2}$" from the rear principal point of the second optical system OS2 to the imaging surface of the second image sensor S2. "$m_{OD2}$" is a magnification of the second subject image at the image formation position of the second subject image when the subject 100 is located at the distance "a+D". "$a_{FD2}$" is the distance from the front principal point of the second optical system OS2 to the subject 100 when the second subject image is in the best focus on the imaging surface of the second image sensor S2.

Therefore, an image magnification ratio "MR" between the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 can be calculated according to the following equation (11).

[Equation 11]

$$MR = \frac{m_2}{m_1} = \frac{f_2}{f_1} \cdot \frac{a_{FD1} - f_1}{a_{FD2} - f_2} \cdot \frac{EP_2 \cdot a_{FD2}}{f_1^2 - EP_1 \cdot f_1 +} \cdot \frac{EP_1 \cdot a}{f_2^2 - EP_2 \cdot f_2 +} = \qquad (11)$$
$$EP_1 \cdot a_{FD1} \quad EP_2 \cdot (a+D)$$

$$K \cdot \frac{f_1^2 - EP_1 \cdot f_1 +}{f_2^2 - EP_2 \cdot f_2 +}$$
$$EP_2 \cdot (a+D)$$

Here, "K" is a coefficient and represented by the following equation (12) constituted of the fixed values "$f_1$", "$f_2$", "$EP_1$", "$EP_2$", "$a_{FD1}$" and "$a_{FD2}$" determined by the configurations of the first imaging system IS1 and the second imaging system IS2.

[Equation 12]

$$K = \frac{f_2}{f_1} \cdot \frac{a_{FD1} - f_1}{a_{FD2} - f_2} \cdot \frac{f_2^2 - EP_2 \cdot f_2 +}{f_1^2 - EP_1 \cdot f_1 +} \qquad (12)$$
$$EP_1 \cdot a_{FD1}$$

As is clear from the above equation (11), the image magnification ratio "MR" between the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 changes according to the distance "a" from the front principal point of the first optical system OS1 to the subject 100.

By solving the above equation (11) for the distance "a", the following general equation (13) for the distance "a" to the subject 100 can be obtained.

[Equation 13]

$$a = \frac{K \cdot (f_1^2 - EP_1 \cdot f_1) - MR \cdot (f_2^2 - EP_2 \cdot f_2 + EP_2 \cdot D)}{MR \cdot EP_2 - K \cdot EP_1} \qquad (13)$$

In the above equation (13), "$f_1$", "$f_2$", "$EP_1$", "$EP_2$", "D" and "K" are the fixed values determined by the configurations of the first imaging system IS1 and the second imaging system IS2. Thus, if the image magnification ratio "MR" can be obtained, it is possible to calculate the distance "a" from the front principal point of the first optical system OS1 to the subject 100.

Figure 3:
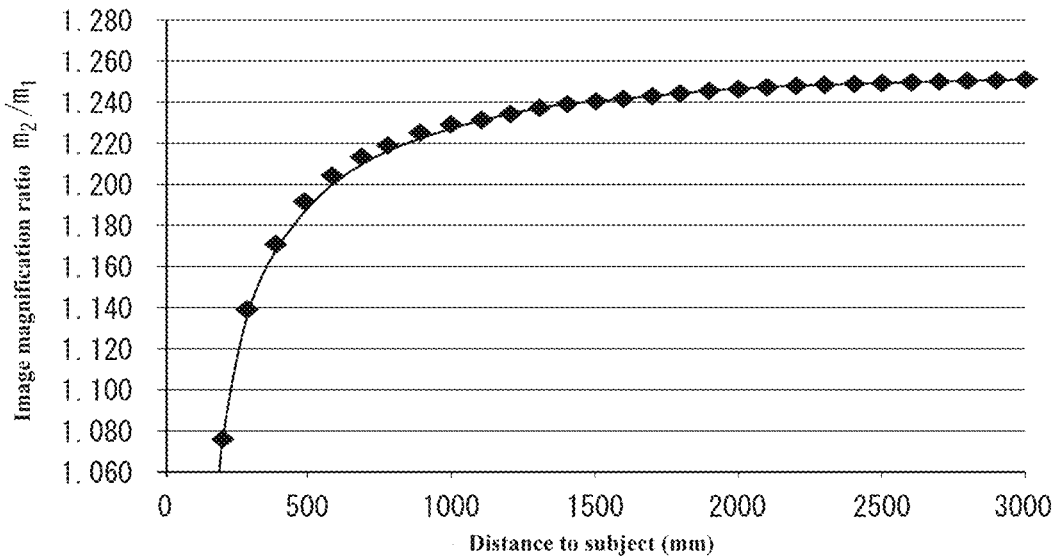
FIG. 3 is a graph for explaining that the image magnification ratio between a magnification of a first subject image formed by a first optical system shown in FIG. 2 and a magnification of a second subject image formed by a second optical system shown in FIG. 2 changes according to a distance to a subject.

FIG. 3 shows an exemplary relationship between the image magnification ratio "MR" of the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 and the distance "a" to the subject 100, which is derived from the above equation (13). As is clear from FIG. 3, one-to-one relationship is established between the value of the image magnification ratio "MR" and the distance "a" to the subject 100. On the other hand, the image magnification ratio "MR" can be calculated according to the following equation (14).

[Equation 14]

$$MR = \frac{m_2}{m_1} = \frac{Y_{FD2}/sz}{Y_{FD1}/sz} = \frac{Y_{FD2}}{Y_{FD1}} \qquad (14)$$

Here, "sz" is an actual size (height or width) of the subject 100, "$Y_{FD1}$" is a size (image height or image width) of the first subject image formed on the imaging surface of the first image sensor S1 by the first optical system OS1 and "$Y_{FD2}$" is a size (image height or image width) of the second subject image formed on the imaging surface of the second image sensor S2 by the second optical system OS2.

The size "$Y_{FD1}$" of the first subject image and the size "$Y_{FD2}$" of the second subject image can be actually measured from an image signal of the first subject image and an image signal of the second subject image which are respectively obtained by imaging the first subject image with the first image sensor S1 and imaging the second subject image with the second image sensor S2. Therefore, by actually measuring the size "$Y_{FD1}$" of the first subject image and the size "$Y_{FD2}$" of the second subject image from the image signal of the first subject image and the image signal of the second subject image obtained by actually imaging the subject 100 with the first imaging system IS1 and the second imaging system IS2, it is possible to obtain the image magnification ratio "MR" between the magnification "$m_1$" of the first subject image and the magnification "$m_2$" of the second subject image based on the measured size "$Y_{FD1}$" and the measured size "$Y_{FD2}$".

The distance measuring camera of the present invention obtains the image magnification ratio "MR" between the magnification "$m_1$" of the first subject image and the magnification "$m_2$" of the second subject image from the actually measured size "$Y_{FD1}$" of the first subject image and the actually measured size "$Y_{FD2}$" of the second subject image to calculate the distance "a" from the front principal point of the first optical system OS1 to the subject 100 according to the above-described principle. The distance "a" to the subject 100 calculated based on the image magnification ratio "MR" is treated as a first candidate for the distance "a" to the subject 100.

In this regard, as is clear from the above equation (11), when the focal length "$f_1$" of the first optical system OS1 is equal to the focal length "$f_2$" of the second optical system OS2 ("$f_1$"="$f_2$"), the distance "$EP_1$" from the exit pupil of the first optical system OS1 to the image formation position of the first subject image when the subject 100 is located at the infinite distance point is equal to the distance "$EP_2$" from the exit pupil of the second optical system OS2 to the image formation position of the second subject image when the subject 100 is located at the infinite distance point ("$EP_1$"="$EP_2$") and the depth disparity "D" in the depth direction (the optical axis direction) does not exist between the front principal point of the first optical system OS1 and the front principal point of the second optical system OS2 ("D"=0), the image magnification ratio "MR" is not established as the function of the distance "a" and the image magnification ratio "MR" becomes a constant value. In this case, the change of the magnification "$m_1$" of the first subject image according to the distance "a" to the subject 100 becomes the same as the change of the magnification "$m_2$" of the second subject image according to the distance "a" to the subject 100 and thus it becomes impossible to calculate the first candidate for the distance "a" from the first optical system OS1 to the subject 100 based on the image magnification ratio "MR".

Further, as a special condition, even if the conditions of "$f_1$"≠"$f_2$", "$EP_1$"≠"$EP_2$" and "D"=0 are satisfied, in a case of "$f_1$"="$EP_1$" and "$f_2$"="$EP_2$", the image magnification ratio "MR" is not established as the function of the distance "a" and thus the image magnification ratio "MR" becomes a constant value. In such a special case, it is impossible to calculate the first candidate for the distance "a" from the first optical system OS1 to the subject 100 based on the image magnification ratio "MR".

Therefore, in the distance measuring camera of the present invention, the first optical system OS1 and the second optical system OS2 are configured and arranged so that at least one of the following three conditions is satisfied, and thereby the change of the magnification "$m_1$" of the first subject image according to the distance "a" to the subject 100 is different from the change of the magnification "$m_2$" of the second subject image according to the distance "a" to the subject 100.

(First condition) The focal length "$f_1$" of the first optical system OS1 and the focal length "$f_2$" of the second optical system OS2 are different from each other ("$f_1$"≠"$f_2$").

(Second condition) The distance "$EP_1$" from the exit pupil of the first optical system OS1 to the image formation position of the first subject image when the subject 100 is located at the infinite distance point and the distance "$EP_2$" from the exit pupil of the second optical system OS2 to the image formation position of the second subject image when the subject 100 is located at the infinite distance point are different from each other ("$EP_1$"≠"$EP_2$").

(Third condition) The difference (depth disparity) "D" in the depth direction (the optical axis direction) exists between the front principal point of the first optical system OS1 and the front principal point of the second optical system OS2 ("D"≠0).

In addition, even if at least one of the first to third conditions described above is satisfied, in the above-described special case ("$f_1$"≠"$f_2$", "$EP_1$"≠"$EP_2$", "D"=0, "$f_1$"="$EP_1$" and "$f_2$"="$EP_2$"), the image magnification ratio "MR" is not established as the function of the distance "a" and thus it is impossible to calculate the distance "a" from the first optical system OS1 to the subject 100 based on the image magnification ratio "MR". Therefore, in order to calculate the first candidate for the distance "a" from the first optical system OS1 to the subject 100 based on the image magnification ratio "MR", the distance measuring camera of the present invention is configured to further satisfy a fourth condition that the image magnification ratio "MR" is established as the function of the distance "a".

Therefore, it is possible to calculate the first candidate for the distance "a" from the front principal point of the first optical system OS1 to the subject 100 by calculating the image magnification ratio "MR" from the size "$Y_{FD1}$" of the first subject image and the size "$Y_{FD2}$" of the second subject image actually measured from the image signal of the first subject image and the image signal of the second subject image obtained by the distance measuring camera of the present invention.

Further, since the second optical system OS2 is arranged so as to be separated from the first optical system OS1 by the distance "P" in the direction perpendicular to the optical axis direction of the first optical system OS1 as described above, a parallel disparity (disparity in the direction perpendicular to the optical axis direction of the first optical system OS1 or the second optical system OS2) exists between the first subject image formed by the first optical system OS1 and the second subject image formed by the second optical system OS2. Thus, the distance measuring camera of the present invention can calculate a second candidate for the distance "a" to the subject 100 based on the parallel disparity between the first subject image and the second subject image separately from the calculation of the first candidate for the distance "a" to the subject 100 based on the image magnification ratio "MR" according to the principle described above. In this regard, the calculation of the second candidate for the distance "a" to the subject 100 based on the parallel disparity between the first subject image and the second subject image can be performed using various methods known in the field of the stereo camera type distance measuring camera.

Thus, the distance measuring camera of the present invention is configured to be capable of performing both of the distance measurement based on the image magnification ratio "MR" between the subject images and the distance measurement based on the parallel disparity between the subject images as described above. As described in the section of "BACKGROUND", the distance measurement based on the parallel disparity between the subject images is unsuitable for measuring the distance "a" to the subject 100 located at a near distance from the distance measuring camera but is suitable for measuring the distance "a" to the subject 100 having a small size "sz" and the distance "a" to the subject 100 located at a far distance from the distance measuring camera. On the other hand, the distance measurement based on the image magnification ratio "MR" between the subject images is unsuitable for measuring the distance "a" to the subject 100 having the small size "sz" and the distance "a" to the subject 100 located at the far distance from the distance measuring camera but is suitable for measuring the distance "a" to the subject 100 having a large size "sz" and the distance "a" to the subject 100 located at the near distance from the distance measuring camera.

As described above, the distance measurement based on the parallel disparity between the subject images and the distance measurement based on the image magnification "MR" between the subject images have different strong ranges and different weak ranges. Therefore, the distance measuring camera of the present invention is configured to calculate the first candidate for the distance "a" to the subject 100 based on the image magnification ratio "MR" between the subject images and the second candidate for the distance "a" to the subject 100 based on the parallel disparity between the subject images and select either one of the first candidate and the second candidate as the distance "a" to the subject 100 according to a predetermined condition.

Therefore, according to the distance measuring camera of the present invention, it is possible to accurately calculate the distance "a" to the subject 100 regardless of the size "sz" of the subject 100 and the distance "a" to the subject 100. The distance measuring camera of the present invention for calculating the distance "a" to the subject 100 as described above will be described in detail based on the preferred embodiments shown in the attached drawings.

FIRST EMBODIMENT

Figure 4:
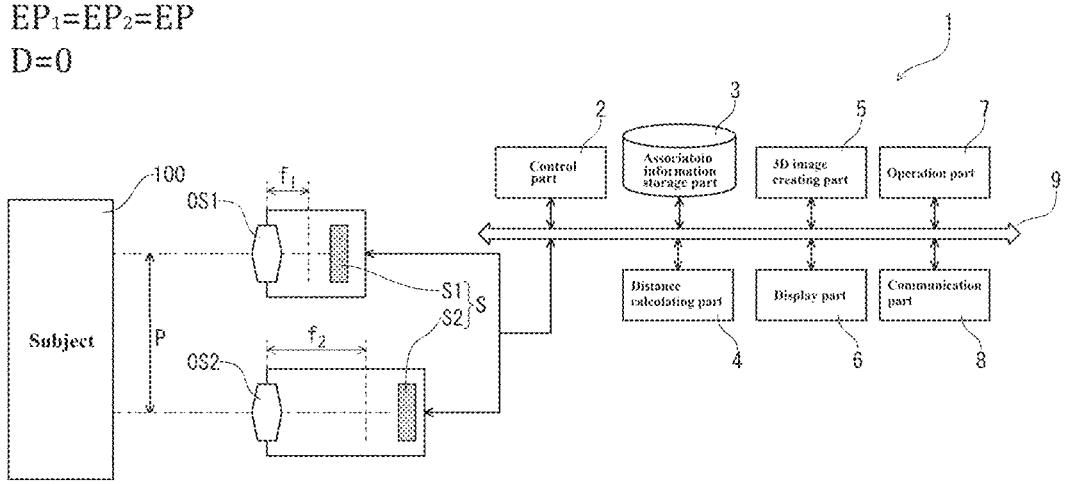
FIG. 4 is a block diagram schematically showing a distance measuring camera according to a first embodiment of the present invention.
Figure 5:
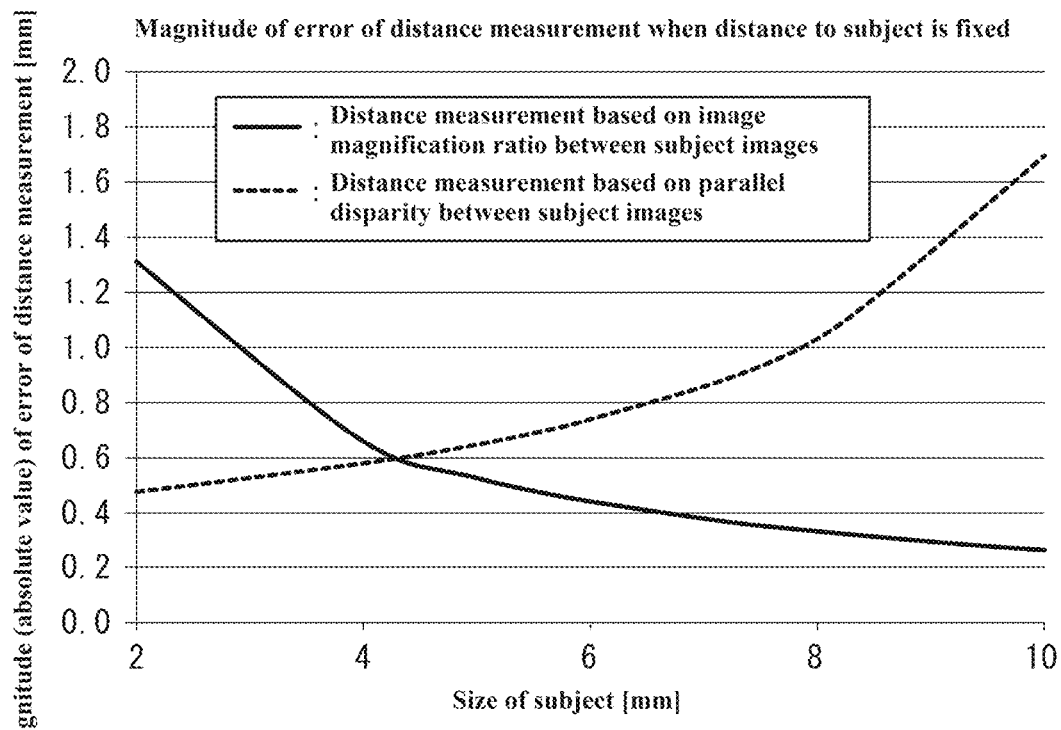
FIG. 5 is a diagram showing an example of changes of magnitudes (absolute values) of errors of a distance measurement based on a parallel disparity between subject images and a distance measurement based on the image magnification ratio between the subject images with respect to a change of a size of a subject when a distance to the subject is fixed.
Figure 6:
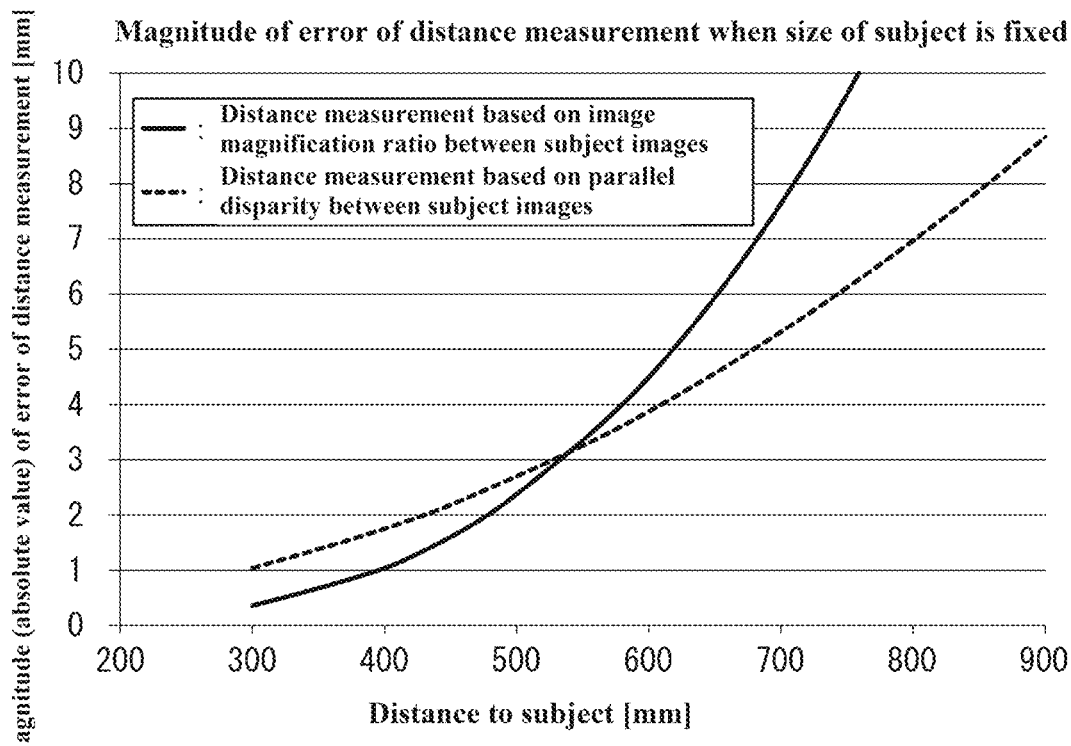
FIG. 6 is a diagram showing an example of the changes of the magnitudes (absolute values) of the errors of the distance measurement based on the parallel disparity between the subject images and the distance measurement based on the image magnification ratio with respect to a change of the distance to the subject when the size of the subject is fixed.

First, a distance measuring camera according to a first embodiment of the present invention will be described with reference to FIG. 4 to FIG. 6. FIG. 4 is a block diagram schematically showing the distance measuring camera according to the first embodiment of the present invention. FIG. 5 is a diagram showing an example of changes of magnitudes (absolute values) of errors of a distance measurement based on a parallel disparity between subject images and a distance measurement based on the image magnification ration with respect to a change of a size of a subject when a distance to the subject is fixed. FIG. 6 is a diagram showing an example of the changes of the magnitudes (absolute values) of the errors of the distance measurement based on the parallel disparity between the subject images and the distance measurement based on the image magnification ration with respect to a change of the distance to the subject when the size of the subject is fixed.

A distance measuring camera 1 shown in FIG. 4 includes a control part 2 containing a processor and a memory for performing control of the distance measuring camera 1, a first optical system OS1 for collecting light from a subject 100 to form a first subject image, a second optical system OS2 for collecting the light from the subject 100 to form a second subject image, which is arranged so as to be shifted from the first optical system OS1 by a distance "P" in a direction perpendicular to an optical axis direction of the first optical system OS1, an imaging part S for imaging the first subject image formed by the first optical system OS1 and the second subject image formed by the second optical system OS2, an association information storage part 3 storing association information for associating an image magnification ratio "MR" between a magnification "$m_1$" of the first subject image and a magnification "$m_2$" of the second subject image with a first candidate for a distance "a" to the subject 100, a distance calculating part 4 for calculating the first candidate for the distance "a" to the subject 100 based on the image magnification ratio "MR" between the magnification "$m_1$" of the first subject image and the magnification "$m_2$" of the second subject image and a second candidate for the distance "a" to the subject 100 based on a parallel disparity between the first subject image and the second subject image and selecting either one of the first candidate and the second candidate as the distance "a" to the subject 100 according to a predetermined condition, a three-dimensional (3D) image creating part 5 for creating a three-dimensional image of the subject 100 based on the first subject image or the second subject image imaged by the imaging part S and the distance "a" to the subject 100 calculated by the distance calculating part 4, a display part 6 such as a liquid crystal panel for displaying arbitrary information, an operation part 7 for inputting an operation from a user, a communication part 8 for performing communication with external devices and a data bus 9 for transmitting and receiving data among components of the distance measuring camera 1.

The distance measuring camera 1 of the present embodiment is characterized in that the first optical system OS1 and the second optical system OS2 are configured so as to satisfy the first condition that the focal length "$f_1$" of the first optical system OS1 and the focal length "$f_2$" of the second optical system OS2 are different from each other ("$f_1$" "$f_2$") among the above-described three conditions required for calculating the first candidate for the distance "a" to the subject 100 based on the image magnification ratio "MR". On the other hand, in the present embodiment, the first optical system OS1 and the second optical system OS2 are configured and arranged so as not to satisfy the other two conditions ("$EP_1$"≠"$EP_2$" and "D"≠0) among the above-described three conditions. Further, the distance measuring camera 1 of the present embodiment is configured so as to satisfy the fourth condition that the image magnification ratio "MR" is established as the function of the distance "a".

Therefore, the above-described general equation (13) for calculating the distance "a" to the subject 100 using the image magnification ratio "MR" is simplified by the conditions of "$EP_1$"="$EP_2$"="EP" and "D"=0 and thus can be expressed by the following equation (15).

[Equation 15]

$$a = \frac{K \cdot (f_1^2 - EP \cdot f_1) - MR \cdot (f_2^2 - EP \cdot f_2)}{EP \cdot (MR - K)} \quad (15)$$

Here, the coefficient "K" is expressed by the following equation (16).

[Equation 16]

$$K = \frac{f_2}{f_1} \cdot \frac{a_{FD1} - f_1}{a_{FD2} - f_2} \cdot \frac{EP \cdot a_{FD2}}{f_1^2 - EP \cdot f_1 + EP \cdot a_{FD1}} \quad (16)$$

The distance measuring camera 1 of the present embodiment calculates the image magnification ratio "MR" between the magnification "$m_1$" of the first subject image and the magnification "$m_2$" of the second subject image by imaging the subject 100 with the imaging part S to calculate the first candidate for the distance "a" to the subject 100 according to the above equation (15). The first candidate for the distance "a" to the subject 100 calculated according to the above equation (15) is temporarily stored in the memory of the control part 2.

Furthermore, as shown in FIG. 4, the first optical system OS1 and the second optical system OS2 are arranged so that the optical axis of the second optical system OS2 is separated from the optical axis of the first optical system OS1 by the distance "P" in the direction perpendicular to the optical axis direction of the first optical system OS1. Thus, a parallel disparity (disparity in the direction perpendicular to the optical axis direction of the first optical system OS1 or the second optical system OS2) exists between the first subject image formed by the first optical system OS1 and the second subject image formed by the second optical system OS2. The distance measuring camera 1 of the present embodiment calculates the parallel disparity between the first subject image and the second subject image by imaging the subject 100 with the imaging part S to calculate the second candidate for the distance "a" to the subject 100 based on the calculated parallel disparity. The second candidate for the distance "a" to the subject 100 calculated as described above is temporarily stored in the memory of the control part 2.

After that, the distance measuring camera 1 of the present embodiment selects either one of the first candidate and the second candidate for the distance "a" to the subject 100 which are temporarily stored in the memory of the control part 2 as the distance "a" to the subject 100 according to the predetermined condition.

Hereinafter, each component of the distance measuring camera 1 will be described in detail. The control part 2 transmits and receives various data and various instructions to and from the respective components through the data bus 9 to perform the control of the distance measuring camera 1. The control part 2 includes the processor for executing arithmetic processing and the memory storing data, programs, modules and the like required for performing the control of the distance measuring camera 1. The processor of the control part 2 can perform the control of the distance measuring camera 1 by using the data, programs, modules and the like stored in the memory. Further, the processor of the control part 2 can provide a desired function by using each component of the distance measuring camera 1. For example, the processor of the control part 2 can use the distance calculating part 4 to perform processing for calculating the distance "a" to the subject 100 based on the first subject image and the second subject image imaged by the imaging part S.

For example, the processor of the control part 2 is one or more operation units such as microprocessors, microcomputers, microcontrollers, digital signal processors (DSPs), central processing units (CPUs), memory control units (MCUs), graphic processing units (GPUs), state machines, logic circuitries, application specific integrated circuits (ASICs) and combinations thereof that can perform operational processes such as signal manipulation based on computer-readable instructions. Among other capabilities, the processor of the control part 2 is configured to fetch computer-readable instructions (such as data, programs and modules) stored in the memory of the control part 2 to perform arithmetic operation, signal control and signal manipulation.

The memory of the control part 2 is one or more removable or non-removable computer-readable media containing volatile memories (such as RAMs, SRAMs and DRAMs), non-volatile memories (such as ROM, EPROMs, EEPROM, flash memories, hard disks, optical discs, CD-ROMs, digital versatile discs (DVDs), magnetic cassettes, magnetic tapes and magnetic disks) and combinations thereof.

The first optical system OS1 has a function of collecting the light from the subject 100 to form the first subject image on an imaging surface of a first image sensor S1 of the imaging part S. The second optical system OS2 has a function of collecting the light from the subject 100 to form the second subject image on an imaging surface of a second image sensor S2 of the imaging part S. Each of the first optical system OS1 and the second optical system OS2 is constituted of one or more lenses and one or more optical elements such as an aperture.

As described above, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"). With this configuration, the first optical system OS1 and the second optical system OS2 are configured so that a change of the magnification "$m_1$" of the first subject image formed by the first optical system OS1 according to the distance "a" to the subject 100 is different from a change of the magnification "$m_2$" of the second subject image formed by the second optical system OS2 according to the distance "a" to the subject 100. The image magnification "MR" is a ratio between the magnification "$m_1$" of the first subject image and the magnification "$m_2$" of the second subject image obtained by the configurations of the first optical system OS1 and the second optical system OS2 as described above and used for calculating the first candidate for the distance "a" to the subject 100.

Further, although the optical axis of the first optical system OS1 and the optical axis of the second optical system OS2 are parallel to each other, the optical axis of the first optical system OS1 and the optical axis of the second optical system OS2 do not coincide with each other as illustrated. Further, the second optical system OS2 is arranged so as to be shifted from the first optical system OS1 by the distance "P" in the direction perpendicular to the optical axis direction of the first optical system OS1. Therefore, the parallel disparity exists between the first subject image formed by the first optical system OS1 and the subject image formed by the second optical system OS2. This parallel disparity between the first subject image and the second subject image is used for calculating the second candidate for the distance "a" to the subject 100.

The imaging part S has a function of imaging the first subject image formed by the first optical system OS1 and the second subject image formed by the second optical system OS2 to obtain an image signal of the first subject image and an image signal of the second subject image. In this embodiment, the imaging part S includes the first image sensor S1 for imaging the first subject image to obtain the image signal of the first subject image and the second image sensor S2 for imaging the second subject image to obtain the image signal of the second subject image.

Although the first image sensor S1 and the first optical system OS1 are provided in one housing and the second image sensor S2 and the second optical system OS2 are provided in another housing in the illustrated aspect, the present invention is not limited thereto. The scope of the present invention involves an aspect in which the first optical system OS1, the second optical system OS2, the first image sensor S1 and the second image sensor S2 are provided in one housing.

Each of the first image sensor S1 and the second image sensor S2 may be a color image sensor such as a CMOS image sensor or a CCD image sensor having a color filter such as an RGB primary color filter and a CMY complementary color filter arranged in any pattern such as a bayer arrangement or a monochrome image sensor having no color filter. In this case, the image signal of the first subject image obtained by the first image sensor S1 and the image signal of the second subject image are color or monochrome luminance information of the subject 100.

Further, each of the first image sensor S1 and the second image sensor S2 may be a phase sensor for obtaining phase information of the subject 100. In this case, the image signal of the first subject image obtained by the first image sensor S1 and the image signal of the second subject image obtained by the second image sensor S2 are phase information of the subject 100.

The first subject image is formed on the imaging surface of the first image sensor S1 by the first optical system OS1 and then the image signal of the first subject image is obtained by the first image sensor S1. The obtained image signal of the first subject image is transmitted to the control part 2 and the distance calculating part 4 through the data bus 9. Similarly, the second subject image is formed on the imaging surface of the second image sensor S2 by the second optical system OS2 and then the image signal of the second subject image is obtained by the second image sensor S2. The obtained image signal of the second subject image is transmitted to the control part 2 and the distance calculating part 4 through the data bus 9. The image signal of the first subject image and the image signal of the second subject image transmitted to the distance calculating part 4 are used for calculating the distance "a" to the subject 100. On the other hand, the image signal of the first subject image and the image signal of the second subject image transmitted to the control part 2 are used for image displaying with the display part 6 and the communication of the image signals with the communication part 8.

The association information storage part 3 is an arbitrary non-volatility storage medium (such as a hard disk and a flash memory) for storing the association information for associating the image magnification ratio "MR" ("$m_2$"/"$m_1$") between the magnification "$m_1$" of the first subject image and the magnification "$m_2$" of the second subject image with the first candidate for the distance "a" from the front principal point of the first optical system OS1 to the subject 100. The association information stored in the association information storage part 3 is information for calculating the first candidate for the distance "a" to the subject 100 from the image magnification ratio "MR" ("$m_2$"/"$m_1$") between the magnification "$m_1$" of the first subject image and the magnification "$m_2$" of the second subject image.

Typically, the association information stored in the association information storage part 3 contains the above equation (15) (or the general equation (13)) for calculating the first candidate for the distance "a" to the subject 100 based on the image magnification ratio "MR" and the above-described fixed values in the equation determined by the configurations and the arrangements of the first optical system OS1 and the second optical system OS2 (for example, the fixed values "$f_1$", "$f_2$", "EP" and "K" for the above equation (15)). Alternatively, the association information stored in the association information storage part 3 may be a look-up table for uniquely associating the image magnification ratio "MR" with the distance "a" to the subject 100. By referring to such association information stored in the association information storage part 3, it becomes possible to calculate the first candidate for the distance "a" to the subject 100 based on the image magnification ratio "MR".

The distance calculating part 4 has a function of calculating the first candidate for the distance "a" to the subject 100 based on the image magnification ratio "MR" between the magnification "$m_1$" of the first subject image imaged by the imaging part S and the magnification "$m_2$" of the second subject image imaged by the imaging part S and the second candidate for the distance "a" to the subject 100 based on the parallel disparity between the first subject image and the second subject image and selecting either one of the first candidate and the second candidate as the distance "a" to the subject 100 according to the predetermined condition.

The distance calculating part 4 receives the image signal of the first subject image from the first image sensor S1 of the imaging part S and receives the image signal of the second subject image from the second image sensor S2 of the imaging part S. After that, the distance calculating part 4 subjects a filtering process such as a Canny method to the image signal of the first subject image and the image signal of the second subject image to extract edge portions of the first subject image in the image signal of the first subject image in the image signal of the first subject image and edge portions of the second subject image in the image signal of the second subject image. The distance calculating part 4 calculates a size (image width or image height) "$Y_{FD1}$" of the first subject image based on the extracted edge portions of the first subject image and a size (image width or image height) "$Y_{FD2}$" of the second subject image based on the extracted edge portions of the second subject image.

A method for calculating the size "$Y_{FD1}$" of the first subject image and the size "$Y_{FD2}$" of the second subject image based on the edge portions of the first subject image and the edge portions of the second subject image extracted by the distance calculating part 4 is not particularly limited to a specific method. For example, it may be possible to consider a separation distance between an uppermost edge portion and a lowest edge portion among the edge portions of the subject image in the image signal as the image height of the subject image or consider a separation distance between a leftmost edge portion and a rightmost edge portion among the edge portions of the subject image in the image signal as the image width of the subject image.

After that, the distance calculating part 4 uses the above equation (14) of "MR"="$Y_{FD2}$"/"$Y_{FD1}$" to calculate the image magnification ratio "MR" between the magnification "$m_1$" of the first subject image and the magnification "$m_2$" of the second subject image based on the size "$Y_{FD1}$" of the first subject image and the size "$Y_{FD2}$" of the second subject image calculated as described above. After the image magnification ratio "MR" is calculated, the distance calculating part 4 refers to the association information stored in the association information storage part 3 to calculate the first candidate for the distance "a" to the subject 100 based on the calculated image magnification ratio "MR". The calculated first candidate for the distance "a" to the subject 100 is temporarily stored in the memory of the control part 2.

In addition to the calculation of the first candidate for the distance "a" to the subject 100, the distance calculating part 4 detects a position of an arbitrary feature point (for example, an arbitrary edge portion) of the first subject image in the image signal of the first subject image and a feature point of the second subject image corresponding to the arbitrary feature point of the first subject image in the image signal of the second subject image. Since a geometric relative relationship between the first optical system OS1 and the second optical system OS2 is known, the distance calculating part 4 can calculate the parallel disparity between the first subject image and the second subject image from a difference between a two-dimensional coordinate (x and y coordinate) of the feature point of the first subject image in the image signal of the first subject image and a two-dimensional coordinate of the corresponding feature point of the second subject image in the image signal of the second subject image.

After the parallel disparity between the first subject image and the second subject image is calculated, the distance calculating part 4 calculates the second candidate for the distance "a" to the subject 100 based on the calculated parallel disparity between the first subject image and the second subject image. A method of calculating the second candidate for the distance "a" to the subject 100 based on the parallel disparity between the first subject image and the second subject image is not particularly limited. Various methods known in the art can be used for calculating the second candidate for the distance "a" to the subject 100 based on the parallel disparity between the first subject image and the second subject image. The calculated second candidate for the distance "a" to the subject 100 is temporarily stored in the memory of the control part 2.

After that, the distance calculating part 4 selects either one of the first candidate and the second candidate as the distance "a" to the subject 100 according to the predetermined condition. As described above, the distance measurement based on the parallel disparity between the subject images is unsuitable for measuring the distance "a" to the subject 100 located at a near distance from the distance measuring camera 1, but is suitable for measuring the distance "a" to the subject 100 having a small size "sz" and the distance "a" to the subject 100 located at a far distance from the distance measuring camera 1. On the other hand, the distance measurement based on the image magnification ratio "MR" between the subject images is unsuitable for measuring the distance "a" to the subject 100 having the small size "sz" and the distance "a" to the subject 100 located at the far distance from the distance measuring camera 1, but is suitable for measuring the distance "a" to the subject 100 having a large size "sz" and the distance "a" to the subject 100 located at the near distance from the distance measuring camera 1.

Thus, the distance calculating part 4 selects either one of the first candidate and the second candidate as the distance "a" to the subject 100 according to a condition related to the size "sz" of the subject 100 or a condition related to the distance "a" to the subject 100. Depending on an application use of the distance measuring camera 1, the distance calculating part 4 is calculated and set in advance so as to use which one of the condition related to the size "sz" of the subject 100 and the condition related to the distance "a" to the subject 100 as the predetermined condition for selecting either one of the first candidate and the second candidate as the distance "a" to the subject 100.

For example, when face three-dimensional shape measurement is performed with the distance measuring camera 1, the condition related to the size "sz" of the subject 100 is used as the predetermined condition. When the face three-dimensional shape measurement is performed, a distance from the distance measuring camera 1 to an entire of face is constant and it is necessary to perform the distance measurement for each part (such as a contour of the face, an eye, a nose, a mouth and an ear) of the face. In this case, each part (such as a contour of the face, an eye, a nose, a mouth, and an ear) of the face corresponds to the subject 100 to be measured.

In the distance measurement for a small-size part such as an eye, a nose, a mouth and an ear, the second candidate calculated based on the parallel disparity between the subject images and temporarily stored in the memory of the control part 2 is selected as the distance "a" to the subject 100. In the distance measurement for a large-size part such as a contour of the face, the first candidate calculated based on the image magnification ratio "MR" between the subject images and temporarily stored in the memory of the control part 2 is selected as the distance "a" to the subject 100. With this configuration, it is possible to accurately calculate the distance "a" to the subject 100 regardless of the size "sz" of the subject 100.

On the other hand, for example, when the distance measuring camera 1 is used for an FA (Factory Automation) application, the condition related to the distance "a" to the subject 100 is used as the predetermined condition. When the distance measuring camera 1 is used in a robot arm for the FA application, the distance measuring camera 1 is embedded in the robot arm and a distance from the robot arm to an assembly or a product to be picked up is calculated by the distance measuring camera 1. In this case, the assembly or the product to be picked up corresponds to the subject 100 to be measured.

Although a size of the assembly or the product is constant, the distance from the robot arm to the assembly or the product changes depending on a posture or a position of the robot arm. When the distance from the robot arm to the assembly or the product is short, the first candidate calculated based on the image magnification ratio "MR" between the subject images and temporarily stored in the memory of the control part 2 is selected as the distance "a" to the subject 100. When the distance from the robot arm to the assembly or the product is long, the second candidate calculated based on the parallel disparity between the subject images and temporarily stored in the memory of the control part 2 is selected as the distance "a" to the subject 100. With this configuration, it is possible to accurately calculate the distance "a" to the subject 100 regardless of the distance "a" to the subject 100.

As described above, depending on the application use of the distance measuring camera 1, it is calculated and set in advance which one of the condition related to the size "sz" of the subject 100 and the condition related to the distance "a" to the subject 100 should be used as the predetermined condition for selecting either one of the first candidate and the second candidate as the distance "a" to the subject 100.

Regarding the condition related to the size "sz" of the subject 100, FIG. 5 shows magnitudes (absolute values) of errors of the distance measurement based on the image magnification ratio "MR" between the subject images and the distance measurement based on the parallel disparity between the subject images with respect to a change of the size "sz" of the subject 100 when the distance "a" to the subject 100 is fixed (in this example, "a"=300 mm).

In this regard, the graph shown in FIG. 5 shows one example of changes of the magnitudes (absolute values) of the errors of the distance measurement based on the image magnification ratio "MR" and the distance measurement based on the parallel disparity when the distance measuring camera 1 of the present invention is configured according to the following configuration conditions.

Focal length "$f_1$" of the first optical system OS1: 12.4 mm

Distance "$EP_1$" from the exit pupil of the first optical system OS1 to the image formation position of the first subject image when the subject 100 is located at the infinite distance point: 34.5 mm Distance "$a_{FD1}$" from the front principal point of the first optical system OS1 to the subject 100 when the first subject image is in the best focus on the first image sensor S1: 458 mm Focal length "$f_2$" of the second optical system OS2: 5.1 mm Distance "$EP_2$" from the exit pupil of the second optical system OS2 to the image formation position of the second subject image when the subject 100 is located at the infinite distance point: 147.4 mm Distance "$a_{FD2}$" from the front principal point of the second optical system OS2 to the subject 100 when the second subject image is in the best focus on the second image sensor S2: 292 mm Separation distance "P" between the optical axis of the first optical system OS1 and the optical axis of the second optical system OS2 in the direction perpendicular to the optical axis direction of the first optical system OS1 or the second optical system OS2: 27 mm Depth disparity "D" between the front principal point of the first optical system OS1 and the front principal point of the second optical system OS2: 123 mm Although the first optical system OS1 and the second optical system OS2 are configured and arranged so as to satisfy all of the above-mention first to third conditions ("$f_1$"≠"$f_2$", "$EP_1$"≠"$EP_2$" and "D"≠0) for calculating the first candidate for the distance "a" to the subject 100 based on the image magnification ratio "MR" between the subject images according to the above-described configuration conditions for the graph shown in FIG. 5, a relationship, which will be described with reference to the graph in FIG. 5, between the errors of the distance measurement based on the image magnification ratio "MR" between the subject images and the distance measurement based on the parallel disparity between the subject images is established regardless of the above-described first to third conditions ("$f_1$"≠"$f_2$", "$EP_1$"≠"$EP_2$" and "D"≠0). Namely, even in a case where the first optical system OS1 and the second optical system OS2 are configured so as to satisfy only the first condition ("$f_1$"≠"$f_2$") as described in the present embodiment, a case where the first optical system OS1 and the second optical system OS2 are configured and arranged so as to satisfy only the second condition ("$EP_1$"≠"$EP_2$") or the third condition ("D"≠0) as described in other embodiments or a case where the first optical system OS1 and the second optical system OS2 are configured and arranged so as to satisfy two or all of the first to third conditions, the relationship, which will be described with reference to the graph in FIG. 5, between the errors of the distance measurement based on the image magnification ratio "MR" between the subject images and the distance measurement based on the parallel disparity between the subject images is established. This discussion can be also applied to a relationship, which will be described with reference to a graph in FIG. 6, between the errors of the distance measurement based on the image magnification ratio "MR" between the subject images and the distance measurement based on the parallel disparity between the subject images.

As is clear from FIG. 5, depending on whether or not the value of the size "sz" of the subject 100 is larger than an intersection point (which serves as a boundary) of a curve (solid line) representing the magnitude of the error of the distance measurement based on the image magnification ratio "MR" between the subject images and a curve (dotted line) representing the magnitude of the error of the distance measurement based on the parallel disparity between the subject images, it is changed that which one of the distance measurement based on the image magnification ratio "MR" between the subject images and the distance measurement based on the parallel disparity between the subject images is more accurate. Therefore, the intersection point of the curve representing the magnitude of the error of the distance measurement based on the image magnification ratio "MR" between the subject images and the curve representing the magnitude of the error of the distance measurement based on the parallel disparity between the subject images can be utilized as a threshold value related to the size "sz" of the subject 100 for determining which one of the first candidate and the second candidate should be selected by the distance calculating part 4 as the distance "a" to the subject 100.

In FIG. 5, as the size "sz" of the subject 100 increases, the error of the distance measurement based on the parallel disparity between the subject images increases. This does not mean that the parallel disparity between the subject images decreases as the size "sz" of the subject 100 increases. The increase of the error of the distance measurement based on the parallel disparity between the subject images along with the increase of the size "sz" of the subject 100 is caused by a difference between the focal length "$f_1$" of the first optical system OS1 and the focal length "$f_2$" of the second optical system OS2, and the depth disparity "D" between the front principal point of the first optical system OS1 and the front principal point of the second optical system OS2. For example, in a case where the focal length "$f_1$" of the first optical system OS1 and the focal length "$f_2$" of the second optical system OS2 are different from each other like the above-described configuration conditions for the graph in FIG. 5 ("$f_1$"≠"$f_2$"), when a same error corresponding to a certain number of pixels (variation in an image position) is added to both of the first subject image and the second subject image, an effect of the error with respect to the subject image formed by the optical system having the longer focal length is larger than an effect of the error of the subject image formed by the optical system having the shorter focal length. Therefore, as the size "sz" of the subject 100 increases, the error of the distance measurement based on the parallel disparity between the subject images increases as shown in FIG. 5. In other words, if the first optical system OS1 and the second optical system OS2 have the same characteristics and the depth disparity "D" does not exist between the front principal point of the first optical system OS1 and the front principal point of the second optical system OS2, the error of the distance measurement based on the parallel disparity between the subject images does not depend on the size "sz" of the subject 100 and becomes constant with respect to the size "sz" of the subject 100.

In the case of configuring the distance measuring camera 1 according to the above-described configuration conditions, the threshold value related to the size "sz" of the subject 100 is about 4 mm. This threshold value is calculated and set in advance according to the configuration of the distance measuring camera 1 and stored in the memory of the control part 2 in a non-rewritable manner at the time of manufacturing or shipping the distance measuring camera 1.

When the size "sz" of the subject 100 is less than the above-described threshold value, the magnitude of the error of the distance measurement based on the parallel disparity between the subject images is smaller than the magnification of the error of the distance measurement based on the image magnification ratio "MR" between the subject images. On the other hand, when the size "sz" of the subject 100 is larger than the above-described threshold value, the magnitude of the error of the distance measurement based on the image magnification ratio "MR" between the subject images is smaller than the magnitude of the error of the distance measurement based on the parallel disparity between the subject images. Therefore, when the size "sz" of the subject 100 is less than the above-described threshold value, it is preferable to select the second candidate calculated based on the parallel disparity between the subject images as the distance "a" to the subject 100. On the other hand, when the size "sz" of the subject 100 is larger than the above-described threshold value, it is preferable to select the first candidate calculated based on the image magnification ratio "MR" between the subject images as the distance "a" to the subject 100.

The first candidate and the second candidate for the distance "a" to the subject 100 calculated by the distance calculating part 4 and stored in the memory of the control part 2 can be considered as a provisional value of the distance "a" to the subject 100. Therefore, the distance calculating part 4 can obtain a first provisional value of the size "sz" of the subject 100 based on the first candidate for the distance "a" to the subject 100 and a second provisional value of the size "sz" of the subject 100 based on the second candidate for the distance "a" to the subject 100 from the relational expression between the first subject image and the subject 100 derived from the triangular similarity relationship (the size "sz" of the subject 100: the size "$Y_{FD1}$" of the first subject image=the first candidate or the second candidate for the distance "a" to the subject 100: the distance "$b_{FD1}$" from the rear principal point of the first optical system OS1 to the imaging surface of the first image sensor S1).

Therefore, if the distance calculating part 4 is set so as to use the condition related to the size "sz" of the subject 100 as the predetermined condition, the distance calculating part 4 selects the second candidate calculated based on the parallel disparity between the subject images as the distance "a" to the subject 100 when both of the first provisional value and the second provisional value of the size "sz" of the subject 100 are less than the above-described threshold value and selects the first candidate calculated based on the image magnification ratio "MR" between the subject images as the distance "a" to the subject 100 when both of the first provisional value and the second provisional value of the size "sz" of the subject 100 are equal to or larger than the above-described threshold value.

In other cases, that is, in a case where the first provisional value of the size "sz" of the subject 100 is less than the above-described threshold value and the second provisional value of the size "sz" of the subject 100 is equal to or larger than the above-described threshold value or a case where the first provisional value of the size "sz" of the subject 100 is equal to or larger than the above-described threshold value and the second provisional value of the size "sz" of the subject 100 is less than the above-described threshold value, the distance calculating part 4 cannot appropriately determine which one of the first candidate and the second candidate should be selected as the distance "a" to the subject 100 according to the condition related to the size "sz" of the subject 100. In these cases, it is preferable that the distance calculating part 4 does not use the condition related to the size "sz" of the subject 100 but the condition related to the distance "a" to the subject 100 described later to determine which one of the first candidate and the second candidate should be selected as the distance "a" to the subject 100.

Regarding the condition related to the distance "a" to the subject 100, FIG. 6 shows an example of changes of the magnitudes (absolute values) of the error of the distance measurement based on the image magnification ratio "MR" between the subject images and the distance measurement based on the parallel disparity between the subject images with respect to a change of the distance "a" to the subject 100 when the size "sz" of the subject 100 is fixed (in this example, "sz"=80 mm). In this regard, the graph shown in FIG. 6 is obtained by configuring the distance measuring camera 1 according to the same configuration conditions as the configuration conditions of the distance measuring camera 1 which is set for obtaining the graph shown in FIG. 5 described above.

As is clear from FIG. 6, depending on whether or not the value of the distance "a" to the subject 100 is larger than an intersection (which serves as a boundary) of a curve (solid line) representing the magnitude of the error of the distance measurement based on the image magnification ratio "MR" between the subject images and a curve (dotted line) representing the magnitude of the error of the distance measurement based on the parallel disparity between the subject images, it is changed that which one of the distance measurement based on the image magnification ratio "MR" between the subject images and the distance measurement based on the parallel disparity between the subject images is more accurate. Therefore, the intersection of the curve representing the magnitude of the error of the distance measurement based on the image magnification ratio "MR" between the subject images and the curve representing the magnitude of the error of the distance measurement based on the parallel disparity between the subject images can be utilized as a threshold value related to the distance "a" to the subject 100 for determining which one of the first candidate and the second candidate should be selected as the distance "a" to the subject 100 by the distance calculating part 4.

In the case of configuring the distance measuring camera 1 according to the above-described configuration conditions, the threshold value for the distance "a" to the subject 100 is about 550 mm. This threshold value is calculated and set in advance according to the configuration of the distance measuring camera 1 and stored in the memory of the control part 2 in a non-rewritable manner at the time of manufacturing or shipping the distance measuring camera 1.

When the distance "a" to the subject 100 is less than the above-described threshold value, the magnitude of the error of the distance measurement based on the image magnification ratio "MR" between the subject images is smaller than the magnitude of the error of the distance measurement based on the parallel disparity between the subject images. On the other hand, when the distance "a" to the subject 100 is larger than the above-described threshold value, the magnitude of the error of the distance measurement based on the parallel disparity between the subject images is smaller than the magnitude of the error of the distance measurement based on the image magnification ratio "MR" between the subject images. Therefore, when the distance "a" to the subject 100 is less than the above-described threshold value, it is preferable to select the first candidate calculated based on the image magnification ratio "MR" between the subject images as the distance "a" to the subject 100. On the other hand, when the distance "a" to the subject 100 is larger than the above-described threshold value, it is preferable to select the second candidate calculated based on the parallel disparity between the subject images as the distance "a" to the subject 100.

Further, the first candidate and the second candidate for the distance "a" to the subject 100 calculated by the distance calculating part 4 and stored in the memory of the control part 2 can be considered as provisional values of the distance "a" to the subject 100. Thus, if the distance calculating part 4 is set to use the condition related to the distance "a" to the subject 100 as the predetermined condition, the distance calculating part 4 selects either one of the first candidate and the second candidate as the distance "a" to the subject 100 based on the first candidate and the second candidate stored in the memory of the control part 2.

Specifically, when both of the first candidate and the second candidate stored in the memory of the control part 2 are less than the above-described threshold value, the distance calculating part 4 selects the first candidate calculated based on the image magnification ratio "MR" between the subject images as the distance "a" to the subject 100. On the other hand, when both of the first candidate and the second candidate stored in the memory of the control part 2 are equal to or larger than the above-described threshold value, the distance calculating part 4 selects the second candidate calculated based on the parallel disparity between the subject images as the distance "a" to the subject 100.

In other cases, that is, in a case where the first candidate is less than the above-described threshold value and the second candidate is equal to or larger than the above-described threshold value or a case where the first candidate is equal to or larger than the above-described threshold value and the second candidate is less than the above-described threshold value, the distance calculating part 4 cannot appropriately determine which one of the first candidate and the second candidate should be selected as the distance "a" to the subject 100 according to the condition related to the distance "a" to the subject 100. In these cases, it is preferable that the distance calculating part 4 determines that which one of the first candidate and the second candidate should be selected as the distance "a" to the subject 100 according to not the condition related to the distance "a" to the subject 100 but the condition related to the size "sz" of the subject 100 described above.

When the distance calculating part 4 cannot determine which one of the first candidate and the second candidate should be selected as the distance "a" to the subject 100 using either the condition relating to the size "sz" of the subject 100 or the condition relating to the distance "a" to the subject 100, the distance calculating part 4 allows the display part 6 to display an error message to prompt the user of the distance measuring camera 1 to change shooting conditions. Alternatively, the distance calculating part 4 may record a code indicating the failure of the distance measurement as data without prompting the user of the distance measuring camera 1 to change the shooting conditions. Such data is checked later by the user of the distance measuring camera 1 and utilized for analyzing that what shooting conditions cause the failure in the distance measurement to the subject 100.

As described above, the distance calculating part 4 selects either one of the first candidate and the second candidate as the distance "a" to the subject 100 according to the condition related to the size "sz" of the subject 100 or the condition related to the distance "a" to the subject 100. Therefore, the distance measuring camera 1 of the present invention can accurately calculate the distance "a" to the subject 100 regardless of the distance "a" to the subject 100 and the size "sz" of the subject 100.

Further, when the subject 100 is located at the near distance from the distance measuring camera 1, the distance calculating part 4 selects the first candidate calculated based on the image magnification ratio "MR" between the subject images as the distance "a" to the subject 100. Since the distance measuring camera 1 of the present invention does not need to take account into the parallel disparity between the subject images when the subject 100 is located at the near distance from the distance measuring camera 1, it is possible to arrange the first optical system OS1 and the second optical system OS2 so as to be close to each other. Therefore, it is possible to reduce the size of the distance measuring camera 1 of the present invention as compared with the conventional stereo type camera.

The three-dimensional image creating part 5 has a function of creating a three-dimensional image of the subject 100 based on the distance "a" to the subject 100 calculated by the distance calculating part 4 and the color or monochrome luminance information of the subject 100 (that is the image signal of the first subject image or the image signal of the second subject image) obtained by the imaging part S. The words of "the three-dimensional image of the subject 100" used in the specification means data in which the calculated distance "a" to the subject 100 is associated with pixels of the color or monochrome two-dimensional image (the normal image) of the subject 100. In this regard, if each of the first image sensor S1 and the second image sensor S2 of the imaging part S is the phase sensor for obtaining the phase information of the subject 100, the three-dimensional image creating part 5 may be omitted.

The display part 6 is panel type display means such as a liquid crystal display part. The display part 6 displays various information containing the color or monochrome luminance information or the phase information of the subject 100 (the image signal of the first subject image or the image signal of the second subject image) obtained by the imaging part S, the distance "a" to the subject 100 calculated by the distance calculating part 4, the three-dimensional image of the subject 100 created by the three-dimensional image creating part 5 and information required for operating the distance measuring camera 1 in the form of characters or images in accordance with the control from the processor of the control part 2.

The operation part 7 is used for performing operations by the user of the distance measuring camera 1. The operation part 7 is not particularly limited to a specific kind as long as the user of the distance measuring camera 1 can use the operation part 7 to perform the operations. For example, it is possible to employ a mouse, a keyboard, a numeric keypad, a button, a dial, a lever, a touch panel or the like as the operation part 7. The operation part 7 transmits signals respectively corresponding to the operations from the user using the distance measuring camera 1 to the processor of the control part 2.

The communication part 8 has a function of inputting data into the distance measuring camera 1 and/or outputting data from the distance measuring camera 1 to external devices. The communication part 8 may be configured to be connected to a network such as the Internet. In this case, the distance measuring camera 1 can use the communication part 8 to perform communication with the external devices such as a web server and a data server provided outside the distance measuring camera 1.

As described above, the distance measuring camera 1 of the present embodiment selects either one of the first candidate and the second candidate for the distance "a" to the subject 100, which are temporarily stored in the memory of the control part 2, as the distance "a" to the subject 100 according to the predetermined condition. Therefore, according to the distance measuring camera 1 of the present invention, it is possible to accurately calculate the distance "a" to the subject 100 regardless of the size "sz" of the subject 100 and the distance "a" to the subject 100.

Furthermore, since the distance measuring camera 1 of the present invention does not need to take account into the parallel disparity between the subject images when the subject 100 is located at the near distance from the distance measuring camera 1, it is possible to arrange the first optical system OS1 and the second optical system OS2 so as to be close to each other. Therefore, it is possible to reduce the size of the distance measuring camera 1 of the present invention as compared with the conventional stereo camera type distance measuring camera.

Second Embodiment

Figure 7:
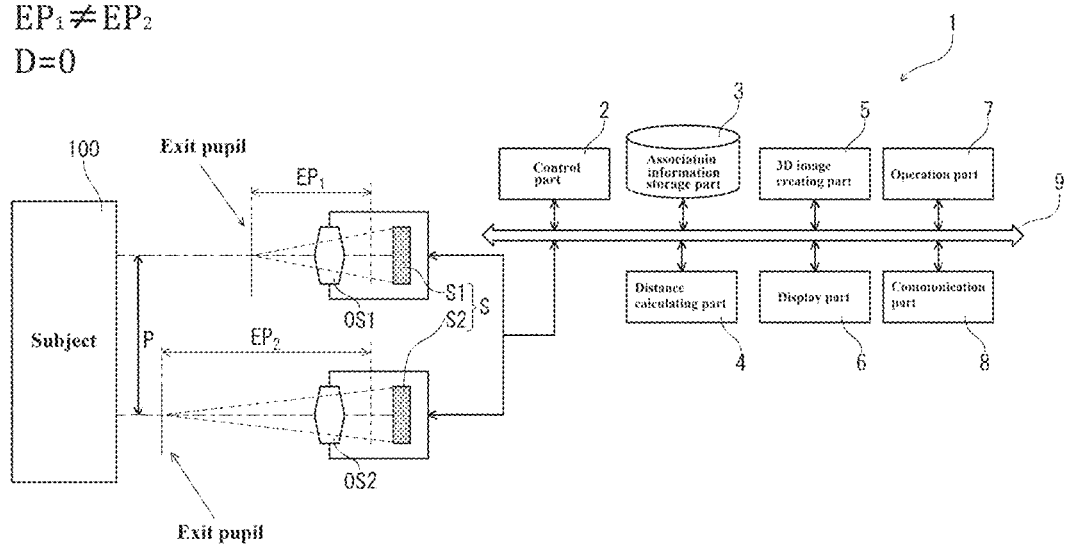
FIG. 7 is a block diagram schematically showing a distance measuring camera according to a second embodiment of the present invention.

Next, a distance measuring camera 1 according to a second embodiment of the present invention will be described in detail with reference to FIG. 7. FIG. 7 is a block diagram schematically showing the distance measuring camera 1 according to the second embodiment of the present invention.

Hereinafter, the distance measuring camera 1 of the second embodiment will be described by placing emphasis on the points differing from the distance measuring camera 1 of the first embodiment with the same matters being omitted from the description. The distance measuring camera 1 of the present embodiment has the same configuration as the configuration of the distance measuring camera 1 of the first embodiment except that the configurations of the first optical system OS1 and the second optical system OS2 are modified.

The distance measuring camera 1 of the present embodiment is characterized in that the first optical system OS1 and the second optical system OS2 are configured so as to satisfy the second condition that the distance "$EP_1$" from the exit pupil of the first optical system OS1 to the image formation position of the first subject image when the subject 100 is located at the infinite distance point and the distance "$EP_2$" from the exit pupil of the second optical system OS2 to the image formation position of the second subject image when the subject 100 is located at the infinite distance point are different from each other ("$EP_1$"≠"$EP_2$") among the above-described three conditions required for calculating the distance "a" to the subject 100 based on the image magnification ratio "MR". On the other hand, in the present embodiment, the first optical system OS1 and the second optical system OS2 are configured and arranged so as not to satisfy the other two conditions ("$f_1$"≠"$f_2$" and "D"≠0) among the above-described three conditions. Further, the distance measuring camera 1 of the present embodiment is configured so as to satisfy the fourth condition that the image magnification ratio "MR" is established as the function of the distance "a".

The general equation (13) for calculating the distance "a" to the subject 100 based on the magnification ratio "MR" is simplified by the conditions of "$f_1$"="$f_2$"="f" and "D"=0 and can be expressed by the following equation (17).

[Equation 17]

$$a = \frac{K \cdot (f^2 - EP_1 \cdot f) - MR \cdot (f^2 - EP_2 \cdot f)}{MR \cdot EP_2 - K \cdot EP_1} \quad (17)$$

Here, the coefficient "K" is expressed by the following equation (18).

[Equation 18]

$$K = \frac{a_{FD1} - f}{a_{FD2} - f} \cdot \frac{f^2 - EP_2 \cdot f + EP_2 \cdot a_{FD2}}{f^2 - EP_1 \cdot f + EP_1 \cdot a_{FD1}} \quad (18)$$

As described above, in the distance measuring camera 1 of the present embodiment, the first optical system OS1 and the second optical system OS2 are configured so that the distance "$EP_1$" from the exit pupil of the first optical system OS1 to the image formation position of the first subject image when the subject 100 is located at the infinite distance point and the distance "$EP_2$" from the exit pupil of the second optical system OS2 to the image formation position of the second subject image when the subject 100 is located at the infinite distance point are different from each other ("$EP_1$"≠"$EP_2$"), and thereby the change of the magnification "$m_1$" of the first subject image according to the distance "a" to the subject 100 and the change of the magnification "$m_2$" of the second subject image according to the distance "a" to the subject 100 are different from each other. Therefore, the distance measuring camera 1 of the present embodiment can uniquely calculate the first candidate for the distance "a" to the subject 100 based on the image magnification ratio "MR" ("$m_2$"/"$m_1$") between the magnification "$m_1$" of the first subject image and the magnification "$m_2$" of the second subject image.

Thus, similarly to the distance measuring camera 1 of the first embodiment described above, the distance measuring camera 1 of the present embodiment can calculate the first candidate for the distance "a" to the subject 100 based on the image magnification ratio "MR" between the subject images, further calculate the second candidate for the distance "a" to the subject 100 based on the parallel disparity between the subject images, and select either one of the first candidate and the second candidate as the distance "a" to the subject 100 according to the predetermined condition. Therefore, according to the present embodiment, it is also possible to provide the same effects as those of the above-described first embodiment.

Third Embodiment

Figure 8:
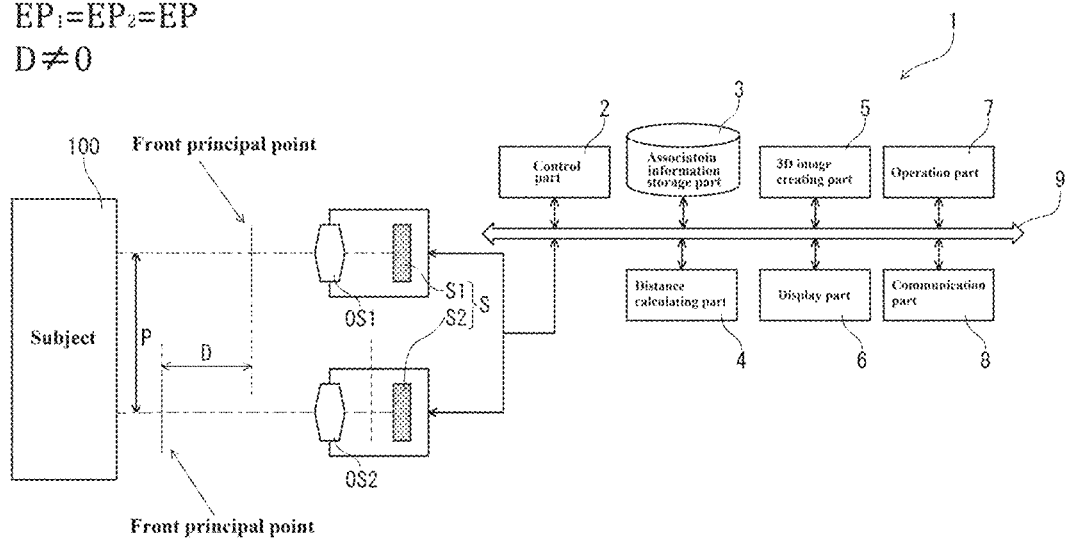
FIG. 8 is a block diagram schematically showing a distance measuring camera according to a third embodiment of the present invention.

Next, a distance measuring camera 1 according to a third embodiment of the present invention will be described in detail with reference to FIG. 8. FIG. 8 is a block diagram schematically showing the distance measuring camera 1 according to the third embodiment of the present invention.

Hereinafter, the distance measuring camera 1 of the third embodiment will be described by placing emphasis on the points differing from the distance measuring camera 1 of the first embodiment with the same matters being omitted from the description. The distance measuring camera 1 of the present embodiment has the same configuration as the configuration of the distance measuring camera 1 of the first embodiment except that the configurations and arrangements of the first optical system OS1 and the second optical system OS2 are modified.

The distance measuring camera 1 of the present embodiment is characterized in that the first optical system OS1 and the second optical system OS2 are configured and arranged so as to satisfy the third condition that the difference (depth disparity) "D" in the depth direction (the optical axis direction) exists between the front principal point of the first optical system OS1 and the front principal point of the second optical system OS2 among the above-described three conditions required for calculating the distance "a" to the subject 100 based on the image magnification ratio "MR". On the other hand, in the present embodiment, the first optical system OS1 and the second optical system OS2 are configured so as not to satisfy the other two conditions ("$f_1$"≠"$f_2$" and "$EP_1$"≠"$EP_2$") among the above-described three conditions. Further, the distance measuring camera 1 of the present embodiment is configured to satisfy the fourth condition that the image magnification ratio "MR" is established as the function of the distance "a".

The general equation (13) for calculating the distance "a" to the subject 100 based on the magnification ratio "MR" is simplified by the conditions of "$f_1$"="$f_2$"="f" and "$EP_1$"="$EP_2$"="EP" and can be expressed by the following equation (19).

[Equation 19]

$$a = \frac{K \cdot (f^2 - EP \cdot f) - MR \cdot (f^2 - EP \cdot f + EP \cdot D)}{EP \cdot (MR - K)} \quad (19)$$

Here, the coefficient "K" is expressed by the following equation (20).

[Equation 20]

$$K = \frac{a_{FD1} - f}{a_{FD2} - f} \cdot \frac{EP \cdot a_{FD2}}{f^2 - EP \cdot f + EP \cdot a_{FD1}} \quad (20)$$

As described above, in the distance measuring camera 1 of the present embodiment, the first optical system OS1 and the second optical system OS2 are configured and arranged so that the difference (depth disparity) "D" in the depth direction (the optical axis direction) exists between the front principal point of the first optical system OS1 and the front principal point of the second optical system OS2 ("D"≠0), and thereby the change of the magnification "$m_1$" of the first subject image according to the distance "a" to the subject 100 and the change of the magnification "$m_2$" of the second subject image according to the distance "a" to the subject 100 are different from each other. Therefore, the distance measuring camera 1 of the present embodiment can uniquely calculate the first candidate for the distance "a" to the subject 100 based on the image magnification ratio "MR" ("$m_2$"/"$m_1$") between the magnification "$m_1$" of the first subject image and the magnification "$m_2$" of the second subject image.

Therefore, similarly to the distance measuring camera 1 of the first embodiment described above, the distance measuring camera 1 of the present embodiment can calculate the first candidate for the distance "a" to the subject 100 based on the image magnification ratio "MR" between the subject images, further calculate the second candidate for the distance "a" to the subject 100 based on the parallel disparity between the subject images, and select either one of the first candidate and the second candidate as the distance "a" to the subject 100 according to the predetermined condition. Therefore, according to the present embodiment, it is also possible to provide the same effects as those of the first embodiment.

Fourth Embodiment

Figure 9:
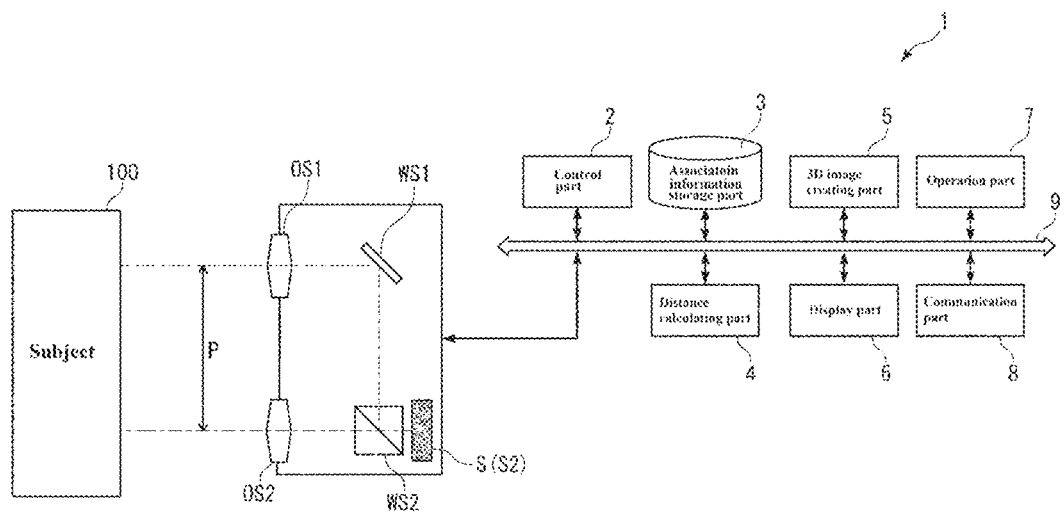
FIG. 9 is a block diagram schematically showing a distance measuring camera according to a fourth embodiment of the present invention.

Next, a distance measuring camera 1 according to a fourth embodiment of the present invention will be described in detail with reference to FIG. 9. FIG. 9 is a block diagram schematically showing the distance measuring camera 1 according to the fourth embodiment of the present invention.

Hereinafter, the distance measuring camera 1 of the fourth embodiment will be described by placing emphasis on the points differing from the distance measuring camera 1 of the first embodiment with the same matters being omitted from the description. The distance measuring camera 1 of the fourth embodiment has the same configuration as the configuration of the distance measuring camera 1 of the first embodiment except that the imaging part S is constituted of only the second image sensor S2, the first optical system OS1 and the second optical system OS2 are provided in one housing, a first wavelength selection element WS1 for restricting a wavelength of the light forming the first subject image is provided on an optical path of the light for forming the first subject image, a second wavelength selection element WS2 for restricting a wavelength of the light forming the second subject image is provided on an optical path of the light for forming the second subject image and the second image sensor S2 is limited to the color image sensor.

In the present embodiment, the first optical system OS1 and the second optical system OS2 are configured so as to satisfy at least one of the first to third conditions required for calculating the distance "a" to the subject 100 based on the magnification ratio "MR" and further satisfy the fourth condition that the image magnification ratio "MR" is established as the function of the distance "a". Namely, the first optical system OS1 and the second optical system OS2 in the present embodiment are configured to have the same configurations as those of the first optical system OS1 and the second optical system OS2 of one of the first embodiment to the third embodiment or combinations thereof.

Further, as shown in FIG. 9, the first optical system OS1 and the second optical system OS2 are provided in the one housing in the present embodiment. Further, the first wavelength selection element WS1 is provided on the optical path of the light collected by the first optical system OS1 to form the first subject image. Furthermore, the second wavelength selection element WS2 is provided on the optical path of the light collected by the second optical system OS2 to form the second subject image.

In the present embodiment, the first wavelength selection element WS1 is a wavelength selection plate-type mirror. The first wavelength selection element WS1 has a function of selectively reflecting only light having a restricted wavelength band. The second wavelength selection element WS2 is a wavelength selection prism-type mirror. The second wavelength selection element WS2 has a function of restricting a wavelength band of light entering from one side of the prism for allowing only light having a restricted wavelength band to pass through the prism and a function of reflecting light entering from the other side of the prism. The first wavelength selection element WS1 and the second wavelength selection element WS2 are configured so that the wavelength band of the light restricted by the first wavelength selection element WS1 is different from the wavelength of the light restricted by the second wavelength selection element WS2.

The light from the subject 100 which is collected by the first optical system OS1 is reflected by the first wavelength selection element WS1 (the wavelength selection plate-type mirror). At this time, the wavelength of the light collected by the first optical system OS1 is restricted by the first wavelength selection element WS1. After that, the light reflected by the first wavelength selection element WS1 is reflected by the second wavelength selection element WS2 (the wavelength selection prism-type mirror) and reaches to the imaging surface of the second image sensor S2. With this configuration, the first subject image is formed on the imaging surface of the second image sensor S2. In this regard, the second wavelength selection element WS2 may be configured to further restrict the wavelength of the light for forming the first subject image when the light for forming the first subject image is reflected by the second wavelength selection element WS2. Alternatively, the second wavelength selection element WS2 may be configured not to further restrict the wavelength of the light for forming the first subject image when the light for forming the first subject image is reflected by the second wavelength selection element WS2.

On the other hand, the light from the subject 100 which is collected by the second optical system OS2 passes through the second wavelength selection element WS2 (the wavelength selection prism-type mirror). At this time, the wavelength of the light collected by the second optical system OS2 is restricted by the second wavelength selection element WS2. After that, the light passing through the second wavelength selection element WS2 reaches to the imaging surface of the second image sensor S2. With this configuration, the second subject image is formed on the imaging surface of the second image sensor S2.

Thus, in the present embodiment, both of the first subject image formed by the first optical system OS1 and the second subject image formed by the second optical system OS2 are formed on the imaging surface of the second image sensor S2. Further, as described above, since the wavelength band of the light restricted by the first wavelength selection element WS1 is different from the wavelength band of the light restricted by the second wavelength selection element WS2, the wavelength of the light forming the first subject image and the wavelength of the light forming the second subject image are different from each other.

In the present embodiment, the second image sensor S2 is the color image sensor having the color filter such as an RGB primary color filter or a CMY complementary color filter in which a plurality of different color filters are arranged in any pattern such as a bayer arrangement. The wavelength band of the light restricted by the first wavelength selection element WS1 corresponds to any one of the color filters of the second image sensor S2. The wavelength band of the light restricted by the second wavelength selection element WS2 corresponds to another one of the color filters of the second image sensor S2.

With this configuration, one of image signals respectively corresponding to the color filters obtained by the second image sensor S2 (for example, one of red color image signal, green color image signal and yellow color image signal) corresponds to the image signal of the first subject image and another one of the image signals corresponds to the image signal of the second subject image. Thus, the second image sensor S2 can separately obtain the image signal of the first subject image and the image signal of the second subject image at the same time.

For example, in a case that the wavelength band of the light restricted by the first wavelength selection element WS1 corresponds to a transparent wavelength band of a red color filter of the color filters of the second image sensor S2, a red color image signal obtained by the second image sensor S2 is the image signal of the first subject image. On the other hand, in a case that the wavelength band of the light restricted by the second wavelength selection element WS2 corresponds to a transparent wavelength band of a green color filter of the color filters of the second image sensor S2, a green color image signal obtained by the second image sensor S2 is the image signal of the second subject image.

With this configuration, the imaging part S can be constituted of a single color image sensor (the second image sensor S2) for imaging both of the first subject image formed by the first optical system OS1 and the second subject image formed by the second optical system OS2. Thus, it is possible to realize the downsizing and the cost-reduction of the distance measuring camera 1.

Although the wavelength selection plate-type mirror is used as the first wavelength selection element WS1 and the wavelength selection prism-type mirror is used as the second wavelength selection element WS2 in the present embodiment, the present invention is not limited thereto. Each of the first wavelength selection element WS1 and the second wavelength selection element WS2 may take any aspect as long as it can restrict the wavelength band of each of the light for forming the first subject image and the second subject image. For example, a wavelength selection filter or an arbitrary optical element having a wavelength selection function and provided on the front or rear side of the first optical system OS1 may be used as the first wavelength selection element WS1. Further, a wavelength selection filter or an arbitrary optical element having a wavelength selection function and provided on the front or rear side of the second optical system OS2 may be used as the second wavelength selection element WS2. In this case, a normal mirror is provided at a position where the first wavelength selection element WS1 of the present embodiment is provided and a normal prism-type mirror is provided at a position where the second wavelength selection element WS2 of the present embodiment is provided.

Further, although the first wavelength selection element WS1 and the second wavelength selection element WS2 are used for allowing the single image sensor (the second image sensor S2) to image both of the first subject image formed by the first optical system OS1 and the second subject image formed by the second optical system OS2 in the present embodiment, the present invention is not limited thereto. For example, the scope of the present invention also involves an aspect in which a shutter is provided in front of each of the first optical system OS1 and the second optical system OS2 and the shutter provided in front of the first optical system OS1 and the shutter provided in front of the second optical system OS2 are alternately opened to allow the single image sensor (the second image sensor S2) to image both of the first subject image and the second subject image. In this case, the imaging part S (the second image sensor S2) may be the phase sensor.

As described with reference to each embodiment, the distance measuring camera 1 of the present invention selects either one of the first candidate and the second candidate for the distance "a" to the subject 100, which are temporarily stored in the memory of the control part 2, as the distance "a" to the subject 100 according to the predetermined condition. Therefore, according to the distance measuring camera 1 of the present invention, it is possible to accurately calculate the distance "a" to the subject 100 regardless of the distance "a" to the subject 100 and the size "sz" of the subject 100.

Further, although the two optical systems (the first optical system OS1 and the second optical system OS2) are used in the above embodiments, the number of the optical systems used in the present invention is not limited thereto. For example, an aspect containing an additional optical system in addition to the first optical system OS1 and the second optical system OS2 is also involved within the scope of the present invention. In this case, the additional optical system is configured and arranged so that a change of a magnification of a subject image formed by the additional optical system according to the distance "a" to the subject 100 is different from the change of the magnification "$m_1$" of the first subject image according to the distance "a" to the subject 100 and the change of the magnification "$m_2$" of the second subject image according to the distance "a" to the subject 100. Additionally, the additional optical system is arranged so as to be shifted from the first optical system OS1 and the second optical system OS2 in the direction perpendicular to the optical axis direction of the first optical system OS1 or the second optical system OS2 so that a parallel disparity exists between the subject image formed by the additional optical system and each of the first subject image and the second subject image.

Further, although the first optical system OS1 and the second optical system OS2 in each of the first to third embodiments are configured and arranged so as to satisfy one of the above-described three conditions required for calculating the distance "a" to the subject 100 based on the image magnification ratio "MR", the present invention is not limited thereto as long as the first optical system OS1 and the second optical system OS2 are configured and arranged so as to satisfy at least one of the above-described three conditions. For example, an aspect in which the first optical system OS1 and the second optical system OS2 are configured and arranged so as to satisfy all or some of the above-described three conditions is also involved within the scope of the present invention.

Distance Measuring Method

Figure 10:
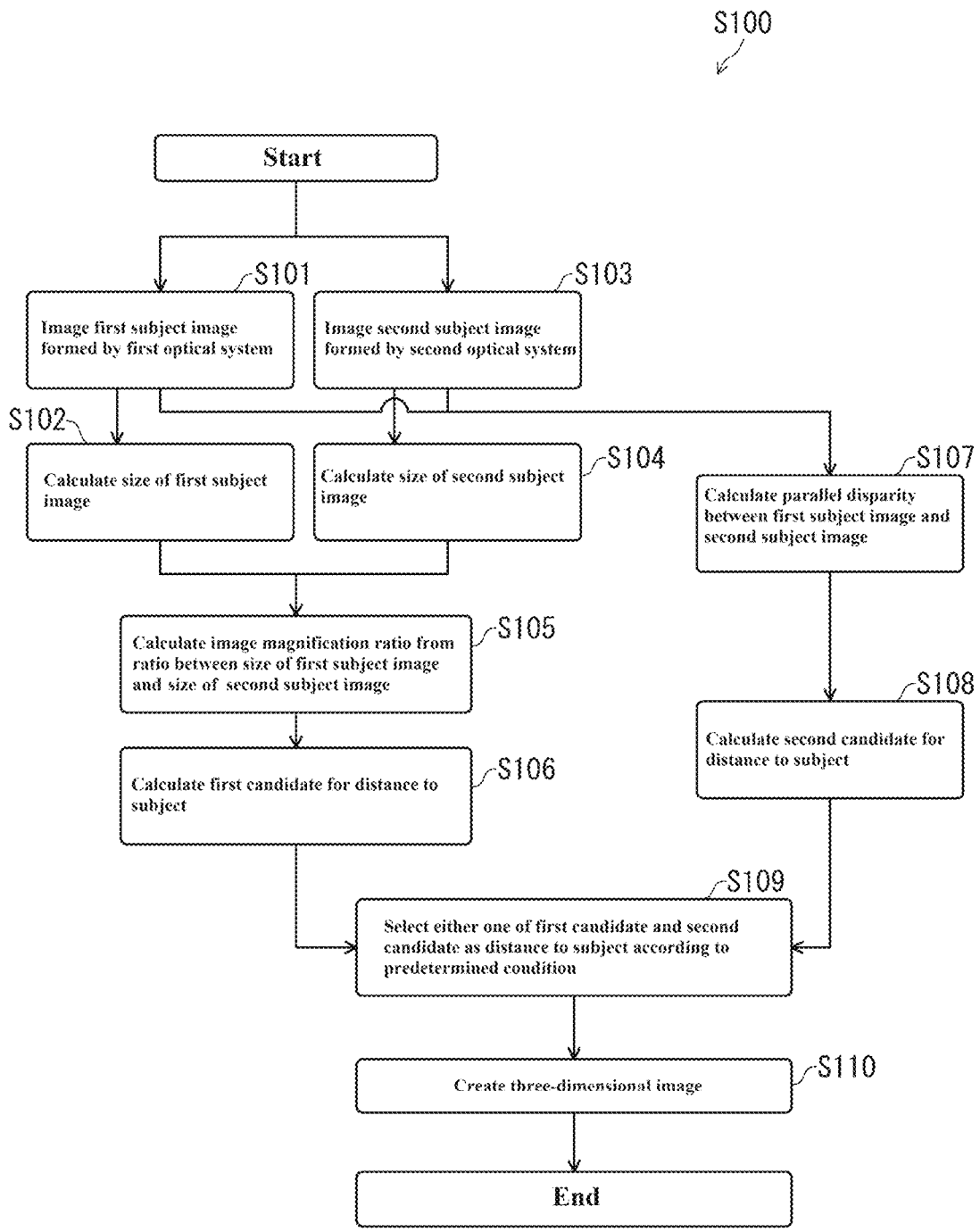
FIG. 10 is a flowchart for explaining a distance measuring method performed by the distance measuring camera of the present invention.

Next, a distance measuring method performed by the distance measuring camera 1 of the present invention will be described with reference to FIG. 10. FIG. 10 is a flowchart for explaining the distance measuring method performed by the distance measuring camera 1 of the present invention. The distance measuring method described in detail below can be performed by using the distance measuring cameras 1 according to the first to fourth embodiments of the present invention and an arbitrary device having the same function as that of the distance measuring camera 1 described above. For the sake of simplicity of description, it is assumed that the distance measuring method is performed by using the distance measuring camera 1 according to the first embodiment.

A distance measuring method S100 shown in FIG. 10 starts when the user of the distance measuring camera 1 uses the operation part 7 to perform an operation for measuring the distance "a" to the subject 100. At a step S101, the first image sensor S1 of the imaging part S images the first subject image formed by the first optical system OS1 to obtain the image signal of the first subject image. The image signal of the first subject image is transmitted to the control part 2 and the distance calculating part 4 through the data bus 9. At a step S102, the distance calculating part 4 calculates the size (image height or image width) "$Y_{FD1}$" of the first subject image from the received image signal of the first subject image.

On the other hand, at a step S103, the second image sensor S2 of the imaging part S images the second subject image formed by the second optical system OS2 to obtain the image signal of the second subject image. The image signal of the second subject image is transmitted to the control part 2 and the distance calculating part 4 through the data bus 9. At a step S104, the distance calculating part 4 calculates the size (image height or image width) "$Y_{FD2}$" of the second subject image from the received image signal of the second subject image.

In this regard, the obtaining of the image signal of the first subject image at the step S101 and the calculation of the size "$Y_{FD1}$" of the first subject image at the step S102 may be performed simultaneously with or separately from the obtaining of the image signal of the second subject image at the step S103 and the calculation of the size "$Y_{FD2}$" of the second subject image at the step S104.

When both of the size "$Y_{FD1}$" of the first subject image and the size "$Y_{FD2}$" of the second subject image are calculated, the process shifts to a step S105. At the step S105, the distance calculating part 4 calculates the image magnification ratio "MR" between the magnification "$m_1$" of the first subject image and the magnification "$m_2$" of the second subject image from the size "$Y_{FD1}$" of the first subject image and the size "$Y_{FD2}$" of the second subject image according to the above equation (14) of "MR"="$Y_{FD2}$"/"$Y_{FD1}$".

Next, at a step S106, the distance calculating part 4 refers to the association information stored in the association information storage part 3 to calculate the first candidate for the distance "a" to the subject 100 based on the calculated image magnification ratio "MR". The calculated first candidate for the distance "a" to the subject 100 is temporarily stored in the memory of the control part 2.

On the other hand, simultaneously with or separately from the calculation of the first candidate for the distance "a" to the subject 100 described above, the distance calculating part 4 calculates the second candidate for the distance "a" to the subject 100 at steps S107 and S108. After the first subject image and the second subject image are imaged at the step S101 and the step S103, the distance calculating part 4 detects a position of an arbitrary feature point of the first subject image in the image signal of the first subject image at the step S107 and further detects a feature point of the second subject image corresponding to the arbitrary feature point of the first subject image in the image signal of the second subject image. Since the geometric relationship between the first optical system OS1 and the second optical system OS2 is known, the distance calculating part 4 calculates the parallel disparity between the first subject image and the second subject image from the difference between the two-dimensional coordinate of the arbitrary feature point of the first subject image in the image signal of the first subject image and the two-dimensional coordinate of the corresponding feature point of the second subject image in the image signal of the second subject image.

After that, at a step S108, the distance calculating part 4 calculates the second candidates for the distance "a" to the subject 100 based on the calculated parallel disparity between the first subject image and the second subject image. The calculated second candidate for the distance "a" to the subject 100 is temporarily stored in the memory of the control part 2.

When both of the calculation of the first candidate for the distance "a" to the subject 100 at the step S106 and the calculation of the second candidate for the distance "a" to the subject 100 at the step S108 are completed, the process shifts to a step S109. At the step S109, the distance calculating part 4 selects either one of the first candidate and the second candidate as the distance "a" to the subject 100 according to the predetermined condition.

More specifically, the distance calculating part 4 selects either one of the first candidate and the second candidate as the distance "a" to the subject 100 according to the condition related to the size "sz" of the subject 100 or the condition related to the distance "a" to the subject 100.

When the distance calculating part 4 is set to use the condition related to the size "sz" of the subject 100 as the predetermined condition, the distance calculating part 4 calculates the first provisional value of the size "sz" of the subject 100 obtained based on the first candidate for the distance "a" to the subject 100 and the second provisional value of the size "sz" of the subject 100 obtained based on the second candidate for the distance "a" to the subject 100 according to the relational expression obtained from the above-described triangular similarity relationship between the first subject image and the subject 100. After that, the distance calculating part 4 determines which one of the first candidate and the second candidate should be selected as the distance "a" to the subject 100 based on the first provisional value and the second provisional value of the size "sz" of the subject 100.

Specifically, when both of the first provisional value and the second provisional value of the size "sz" of the subject 100 are less than the predetermined threshold value related to the size "sz" of the subject 100 stored in the memory of the control part 2, the distance calculating part 4 selects the second candidate calculated based on the parallel disparity between the subject images as the distance "a" to the subject 100. On the other hand, when both of the first provisional value and the second provisional value of the size "sz" of the subject 100 are equal to or larger than the predetermined threshold value related to the size "sz" of the subject 100 stored in the memory of the control part 2, the distance calculating part 4 selects the first candidate calculated based on the image magnification ratio "MR" between the subject images as the distance "a" to the subject 100.

In the other cases, that is, in the case where the first provisional value of the size "sz" of the subject 100 is less than the above-described threshold value and the second provisional value of the size "sz" of the subject 100 is equal to or larger than the above-described threshold value or the case where the first provisional value of the size "sz" of the subject 100 is equal to or larger than the above-described threshold value and the second provisional value of the size "sz" of the subject 100 is less than the above-described threshold value, the distance calculating part 4 cannot determine which one of the first candidate and the second candidate should be selected as the distance "a" to the subject 100 according to the condition related to the size "sz" of the subject 100. In these cases, the distance calculating part 4 does not use the condition related to the size "sz" of the subject 100 but the condition related to the distance "a" to the subject 100 to determine which one of the first candidate and the second candidate should be selected as the distance "a" to the subject 100. In this regard, the predetermined threshold value related to the size "sz" of the subject 100 is calculated and set in advance according to the configuration of the distance measuring camera 1 and stored in the memory of the control part 2 in a non-rewritable manner at the time of manufacturing or shipping the distance measuring camera 1.

On the other hand, when the distance calculating part 4 is set to use the condition related to the distance "a" to the subject 100 as the predetermined condition, the distance calculating part 4 selects either one of the first candidate and the second candidate as the distance "a" to the subject 100 based on the first candidate and the second candidate stored in the memory of the control part 2.

Specifically, when both of the first candidate and the second candidate stored in the memory of the control part 2 are less than the threshold value related to the distance "a" to the subject 100 stored in the memory of the control part 2, the distance calculating part 4 selects the first candidate calculated based on the image magnification ratio "MR" between the subject images as the distance "a" to the subject 100. On the other hand, when both of the first candidate and the second candidate stored in the memory of the control part 2 are equal to or larger than the threshold value related to the distance "a" to the subject 100 stored in the memory of the control part 2, the distance calculating part 4 selects the second candidate calculated based on the parallel disparity between the subject images as the distance "a" to the subject 100.

In the other cases, that is, in the case where the first candidate is less than the above-described threshold value related to the distance "a" to the subject 100 and the second candidate is equal to or larger than the above-described threshold value related to the distance "a" to the subject 100 or the case where the first candidate is equal to or larger than the above-described threshold value related to the distance "a" to the subject 100 and the second candidate is less than the above-described threshold value related to the distance "a" to the subject 100, the distance calculating part 4 cannot appropriately determine which one of the first candidate and the second candidate should be selected as the distance "a" to the subject 100 according to the condition related to the distance "a" to the subject 100. In these cases, the distance calculating part 4 does not use the condition related to the distance "a" to the subject 100 but the condition related to the size "sz" of the subject 100 to determine which one of the first candidate and the second candidate should be selected as the distance "a" to the subject 100. In this regard, the predetermined threshold value related to the distance "a" to the subject 100 is calculated and set in advance according to the configuration of the distance measuring camera 1 and stored in the memory of the control part 2 in a non-rewritable manner at the time of manufacturing or shipping the distance measuring camera 1.

In this regard, in the case where the distance calculating part 4 cannot determine which one of the first candidate and the second candidate should be selected as the distance "a" to the subject 100 even using either the condition related to the size "sz" of the subject 100 or the condition related to the distance "a" to the subject 100, the distance calculating part 4 allows the display part 6 to display an error message to prompt the user of the distance measuring camera 1 to change the shooting conditions. Alternatively, the distance calculating part 4 may record a code indicating a failure of the distance measurement as data without prompting the user of the distance measuring camera 1 to change the shooting conditions. As described above, when the distance calculating part 4 cannot determine which one of the first candidate and the second candidate should be selected as the distance "a" to the subject 100 by using either the condition related to the size "sz" of the subject 100 or the condition related to the distance "a" to the subject 100, the distance measuring method S100 ends.

When the distance calculating part 4 selects either one of the first candidate and the second candidate as the distance "a" to the subject 100 at the step S109, the process proceeds to a step S110. At the step S110, the three-dimensional image creating part 5 creates the three-dimensional image of the subject 100 based on the distance "a" to the subject 100 calculated by the distance calculating part 4 and the color or monochrome luminance information of the subject 100 (the image signal of the first subject image or the image signal of the second subject image) obtained by the imaging part S. In the case where each of the first image sensor S1 and the second image sensor S2 of the imaging part S is the phase sensor for obtaining the phase information of the subject 100, the step S110 is omitted.

After that, the color or monochrome luminance information or the phase information of the subject 100, the distance "a" to the subject 100 and/or the three-dimensional image of the subject 100 obtained in the preceding steps are displayed on the display part 6 or transmitted to the external devices by the communication part 8 and then the distance measuring method S100 ends.

Although the distance measuring camera of the present invention has been described based on the embodiments shown in the accompanying drawings, the present invention is not limited thereto. The configuration of each component of the present invention may be replaced with other arbitrary configurations having equivalent functions. Further, it may be also possible to add other arbitrary components to the configuration of the present invention.

A Person having ordinary skill in the art and belonging in the field and technology of the present invention would add alterations and modifications with respect to the described configuration of the distance measuring camera of the present invention without meaningfully departing from the principle, spirit and scope of the present invention and the distance measuring camera having the modified or changed configuration is also contained in the scope of the present invention. For example, an aspect in which the distance measuring cameras of the first to fourth embodiments are appropriately combined is also involved within the scope of the present invention.

For example, the number and kinds of the components of the distance measuring camera 1 shown in FIGS. 4 and 7 to 9 are merely provided for the illustration of the present invention and thus the present invention is not necessarily limited thereto. The scope of the present invention contains alternations and modifications of the described configuration in which arbitrary components are added or combined or arbitrary components are omitted without meaningfully departing from the principle and the spirit of the present invention. Further, each component of the distance measuring camera 1 may be practiced by hardware, software or a combination of hardware and software.

In addition, the number and kinds of the steps of the distance measuring method S100 shown in FIG. 10 are merely illustrative examples and the present invention is not necessarily limited thereto. An aspect in which any step is added or combined or any step is deleted without departing from the principles and intent of the present invention is also involved within the scope of the present invention.

INDUSTRIAL APPLICABILITY

The distance measuring camera of the present invention selects either one of the first candidate calculated based on the image magnification ratio between the subject images and the second candidate calculated based on the parallel disparity between the subject images as the distance to the subject according to the predetermined condition. Therefore, according to the distance measuring camera of the present invention, it is possible to accurately calculate the distance to the subject regardless of the distance to the subject and the size of the subject.

Further, since the distance measuring camera of the present invention selects the first candidate calculated based on the image magnification ratio between the subject images as the distance to the subject when the subject is located at the near distance from the distance measuring camera, the parallel disparity between the subject images is not used for calculating the distance to the subject located at the near distance from the distance measuring camera. Since it is not necessary to consider the parallel disparity between the subject images when the subject is located at the near distance from the distance measuring camera, it is possible to arrange the first optical system and the second optical system so as to be close to each other in the distance measuring camera of the present invention. Therefore, it is possible to reduce the size of the distance measuring camera of the present invention as compared with the conventional stereo camera type distance measuring camera. For the reasons stated above, the present invention is industrially applicable.

The invention claimed is:

1. A distance measuring camera, comprising:
   a first optical system for collecting light from a subject to form a first subject image;
   a second optical system for collecting the light from the subject to form a second subject image, the second optical system arranged so as to be shifted from the first optical system in a direction perpendicular to an optical axis direction of the first optical system;
   an imaging part for imaging the first subject image formed by the first optical system and the second subject image formed by the second optical system; and
   a distance calculating part for calculating a first candidate for a distance to the subject based on an image magnification ratio between a magnification of the first subject image imaged by the imaging part and a magnification of the second subject image imaged by the imaging part and a second candidate for the distance to the subject based on a parallel disparity, between the first subject image and the second subject image,
   wherein the distance calculating part selects either one of the first candidate and the second candidate as the distance to the subject according to a predetermined condition.

2. The distance measuring camera as claimed in claim 1, wherein the distance calculating part selects the second candidate calculated based on the parallel disparity as the distance to the subject when a size of the subject is less than a predetermined threshold and selects the first candidate calculated based on the image magnification ratio as the distance to the subject when the size of the subject is equal to or larger than the predetermined threshold.

3. The distance measuring camera as claimed in claim 1, wherein the distance calculating part selects the first candidate calculated based on the image magnification ratio as the distance to the subject when both of the first candidate and the second candidate are less than a predetermined threshold and selects the second candidate calculated based on the parallel disparity as the distance to the subject when both of the first candidate and the second candidate are equal to or larger than the predetermined threshold.

4. The distance measuring camera as claimed in claim 1, wherein the first optical system and the second optical system are configured so that a change of the magnification of the first subject image according to the distance to the subject is different from a change of the magnification of the second subject image according to the distance from the subject.

5. The distance measuring camera as claimed in claim 4, wherein the first optical system and the second optical system are configured so that a focal length of the first optical system and a focal length of the second optical system are different from each other, and thereby the change of the magnification of the first subject image according to the distance to the subject is different from the change of the magnification of the second subject image according to the distance to the subject.

6. The distance measuring camera as claimed in claim 4, wherein the first optical system and the second optical system are configured so that a distance from an exit pupil of the first optical system to an image formation position of the first subject image formed by the first optical system when the subject is located at an infinite distance point is different from a distance from an exit pupil of the second optical system to an image formation position of the second subject image formed by the second optical system when the subject is located at the infinite distance point, and thereby the change of the magnification of the first subject image according to the distance to the subject is different from the change of the magnification of the second subject image according to the distance to the subject.

7. The distance measuring camera as claimed in claim 4, wherein a depth disparity in the optical direction of the first optical system exists between a front principal point of the first optical system and a front principal point of the second optical system, and thereby the change of the magnification of the first subject image according to the distance to the subject is different from the change of the magnification of the second subject image according to the distance to the subject.

8. The distance measuring camera as claimed in claim 1, wherein the imaging part contains a first image sensor for imaging the first subject image and a second image sensor for imaging the second subject image.

\* \* \* \* \*